United States Patent
Yamagishi

(10) Patent No.: US 10,924,524 B2
(45) Date of Patent: Feb. 16, 2021

(54) COMMUNICATION DEVICES, COMMUNICATION DATA GENERATION METHOD, AND COMMUNICATION DATA PROCESSING METHOD

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

(*) Notice: Subject to any disclaimer, the term of this patent is extended or adjusted under 35 U.S.C. 154(b) by 207 days.

(21) Appl. No.: 14/770,150

(22) PCT Filed: Dec. 1, 2014

(86) PCT No.: PCT/JP2014/081713
§ 371 (c)(1),
(2) Date: Aug. 25, 2015

(87) PCT Pub. No.: WO2015/107784
PCT Pub. Date: Jul. 23, 2015

(65) Prior Publication Data
US 2016/0315987 A1  Oct. 27, 2016

(30) Foreign Application Priority Data

Jan. 17, 2014 (JP) .............................. JP2014-006879

(51) Int. Cl.
*G06F 15/16* (2006.01)
*H04L 29/06* (2006.01)
(Continued)

(52) U.S. Cl.
CPC ............ *H04L 65/601* (2013.01); *H04L 67/02* (2013.01); *H04N 21/238* (2013.01);
(Continued)

(58) Field of Classification Search
CPC ... H04L 65/601; H04L 67/02; H04N 21/8455; H04N 21/6405; H04N 21/4384;
(Continued)

(56) References Cited

U.S. PATENT DOCUMENTS 5,724,515 A * 3/1998 Barnes .................... H04L 29/06
709/236
5,802,051 A * 9/1998 Petersen ............ H04Q 11/0478
370/395.42

(Continued)

OTHER PUBLICATIONS

Extended European Search Report dated Jun. 1, 2017 in Patent Application No. 14878449.9.

(Continued)

*Primary Examiner* — Douglas B Blair
(74) *Attorney, Agent, or Firm* — Oblon, McClelland, Maier & Neustadt, L.L.P.

(57) ABSTRACT

Provided are devices and methods that enable content distribution of data units generated by dividing a GOP, and GOP reconstruction and reproduction on the reception device side. A transmission device generates a sub GOP media segment as packet-stored data, the sub GOP media segment storing media data including only part of constituent data of a Group of Pictures (GOP) as a processing unit of encoded data and metadata corresponding to the media data, and generates and transmits a packet having an in-GOP location identifier recorded as packet additional information therein, the in-GOP location identifier indicating the in-GOP location of the media data stored in the sub GOP media segment. A reception device arranges media data dispersed and stored in packets by referring to the in-GOP location identifiers stored in received packets, and reconstructs and decodes a GOP.

19 Claims, 20 Drawing Sheets

(51) Int. Cl.
*H04N 21/238* (2011.01)
*H04N 21/6437* (2011.01)
*H04N 21/845* (2011.01)
*H04N 21/8543* (2011.01)
*H04N 21/643* (2011.01)
*H04N 21/6405* (2011.01)
*H04N 21/438* (2011.01)
*H04L 29/08* (2006.01)
*H04N 21/84* (2011.01)

(52) U.S. Cl.
CPC ..... *H04N 21/4384* (2013.01); *H04N 21/6405* (2013.01); *H04N 21/6437* (2013.01); *H04N 21/64322* (2013.01); *H04N 21/84* (2013.01); *H04N 21/8455* (2013.01); *H04N 21/8456* (2013.01); *H04N 21/8543* (2013.01)

(58) Field of Classification Search
CPC ............ H04N 21/64322; H04N 21/84; H04N 21/8543; H04N 21/8456; H04N 21/6437; H04N 21/238
See application file for complete search history.

(56) References Cited

U.S. PATENT DOCUMENTS

| | | | | |
|---|---|---|---|---|
| 5,991,503 | A * | 11/1999 | Miyasaka | H04N 5/783 375/E7.094 |
| 6,965,646 | B1 * | 11/2005 | Firestone | H04N 21/236 375/240.26 |
| 8,751,677 | B2 * | 6/2014 | Li | H04N 5/765 709/231 |
| 8,768,984 | B2 * | 7/2014 | Priddle | H04N 5/91 707/827 |
| 8,806,050 | B2 * | 8/2014 | Chen | H04L 65/607 709/231 |
| 8,930,562 | B2 * | 1/2015 | Chen | H04N 21/234327 709/231 |
| 8,948,249 | B2 * | 2/2015 | Sun | H04N 21/2343 375/240.01 |
| 9,445,136 | B2 * | 9/2016 | Gillies | H04N 21/8456 |
| 9,485,546 | B2 * | 11/2016 | Chen | G11B 27/007 |
| 9,712,890 | B2 * | 7/2017 | Shivadas | H04N 21/8455 |
| 9,843,844 | B2 * | 12/2017 | Walker | H04N 21/6125 |
| 9,860,573 | B2 * | 1/2018 | Kwon | H04N 21/23439 |
| 9,967,598 | B2 * | 5/2018 | Ha | H04N 21/2402 |
| 10,425,666 | B2 * | 9/2019 | Ha | H04N 21/23439 |
| 2002/0194589 | A1 * | 12/2002 | Cristofalo | H04N 7/165 725/32 |
| 2004/0006575 | A1 * | 1/2004 | Visharam | H04N 21/23424 |
| 2004/0010802 | A1 * | 1/2004 | Visharam | H04N 21/2343 725/95 |
| 2007/0186235 | A1 * | 8/2007 | Jarman | H04N 7/163 725/28 |
| 2009/0142041 | A1 * | 6/2009 | Nagasawa | H04N 19/70 386/341 |
| 2009/0228928 | A1 * | 9/2009 | Lee | H04N 7/163 725/55 |
| 2009/0288125 | A1 * | 11/2009 | Morioka | H04N 7/1675 725/110 |
| 2009/0300673 | A1 * | 12/2009 | Bachet | H04N 7/17318 725/31 |
| 2010/0017686 | A1 * | 1/2010 | Luby | H04N 21/2381 714/776 |
| 2011/0093617 | A1 * | 4/2011 | Igarashi | H04N 21/23406 709/246 |
| 2011/0125918 | A1 * | 5/2011 | Ha | H04N 21/2402 709/231 |
| 2011/0129198 | A1 * | 6/2011 | Toma | G11B 27/3027 386/239 |
| 2011/0142426 | A1 * | 6/2011 | Sasaki | G11B 20/1217 386/337 |
| 2011/0286546 | A1 * | 11/2011 | Song | H04L 1/0042 375/295 |
| 2011/0317760 | A1 * | 12/2011 | Chen | G11B 27/007 375/240.12 |
| 2011/0320629 | A1 * | 12/2011 | Wu | H04N 21/4302 709/231 |
| 2012/0013746 | A1 * | 1/2012 | Chen | G11B 27/034 348/180 |
| 2012/0016965 | A1 * | 1/2012 | Chen | H04N 21/23439 709/219 |
| 2012/0020413 | A1 * | 1/2012 | Chen | H04N 19/597 375/240.26 |
| 2012/0023249 | A1 * | 1/2012 | Chen | H04N 21/235 709/231 |
| 2012/0036544 | A1 * | 2/2012 | Chen | H04N 19/597 725/109 |
| 2012/0057640 | A1 * | 3/2012 | Shi | H04N 19/52 375/240.26 |
| 2012/0320925 | A1 | 12/2012 | Park et al. | |
| 2013/0034170 | A1 * | 2/2013 | Chen | H04N 13/00 375/240.25 |
| 2013/0036234 | A1 * | 2/2013 | Pazos | H04L 12/189 709/231 |
| 2013/0091251 | A1 * | 4/2013 | Walker | H04N 21/6125 709/219 |
| 2013/0114670 | A1 * | 5/2013 | Chen | H04N 19/44 375/240.02 |
| 2013/0114705 | A1 * | 5/2013 | Chen | H04N 19/597 375/240.12 |
| 2013/0191550 | A1 * | 7/2013 | Hannuksela | H04N 21/234327 709/231 |
| 2013/0194384 | A1 * | 8/2013 | Hannuksela | H04N 19/597 348/43 |
| 2013/0279576 | A1 * | 10/2013 | Chen | H04N 19/52 375/240.12 |
| 2014/0019635 | A1 * | 1/2014 | Reznik | H04L 65/607 709/231 |
| 2014/0032777 | A1 * | 1/2014 | Yuan | H04L 67/26 709/231 |
| 2014/0222962 | A1 * | 8/2014 | Mao | H04N 21/4305 709/219 |
| 2015/0026358 | A1 * | 1/2015 | Zhang | H04L 65/601 709/231 |
| 2015/0201202 | A1 * | 7/2015 | Hattori | H04N 21/4728 375/240.02 |
| 2016/0204887 | A1 * | 7/2016 | Lee | H04H 20/71 375/295 |
| 2016/0261893 | A1 * | 9/2016 | Oh | H04N 21/238 |
| 2016/0285972 | A1 * | 9/2016 | Puttagunta | H04L 67/1097 |

OTHER PUBLICATIONS

Summons to attend oral proceedings pursuant to Rule 115(1) EPC issued Oct. 8, 2018 in Application No. 14878449.9-1209/3096524, 9 pages.

* cited by examiner

FIG. 6
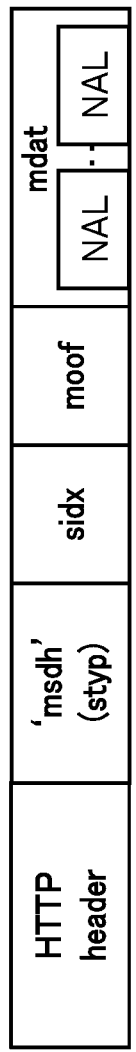
(a) EXAMPLE STRUCTURE 1 OF HTTP PACKET STORING SUB GOP MEDIA SEGMENT
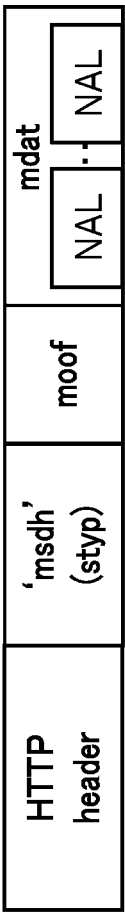
(b) EXAMPLE STRUCTURE 2 OF HTTP PACKET STORING SUB GOP MEDIA SEGMENT

FIG. 10

(1) IP PACKET STORING INITIALIZATION SEGMENT

| IP header | UDP header | LCT header | HTTP header | 'dash' (ftyp) | moov |
|---|---|---|---|---|---|

(2) IP PACKET STORING SUB GOP MEDIA SEGMENT

| IP header | UDP header | LCT header | HTTP header | 'msdh' (styp) | sidx | moof | mdat |
|---|---|---|---|---|---|---|---|
| | | | | | | | NAL ... NAL |

FIG. 15
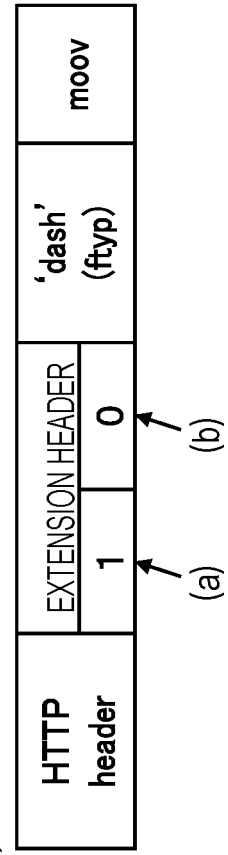
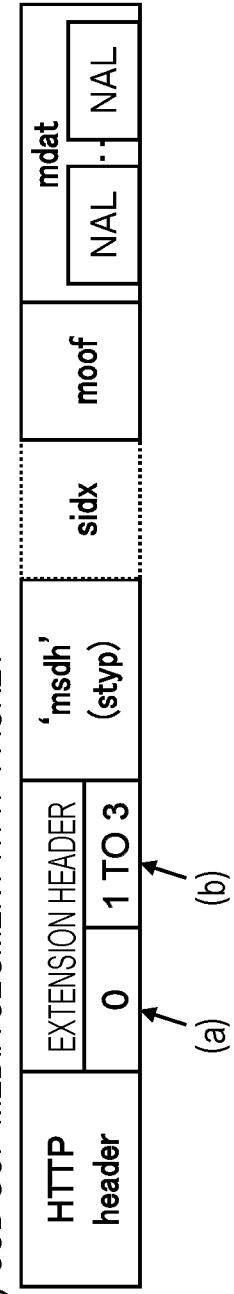
(1) INITIALIZATION SEGMENT HTTP PACKET
(2) SUB GOP MEDIA SEGMENT HTTP PACKET

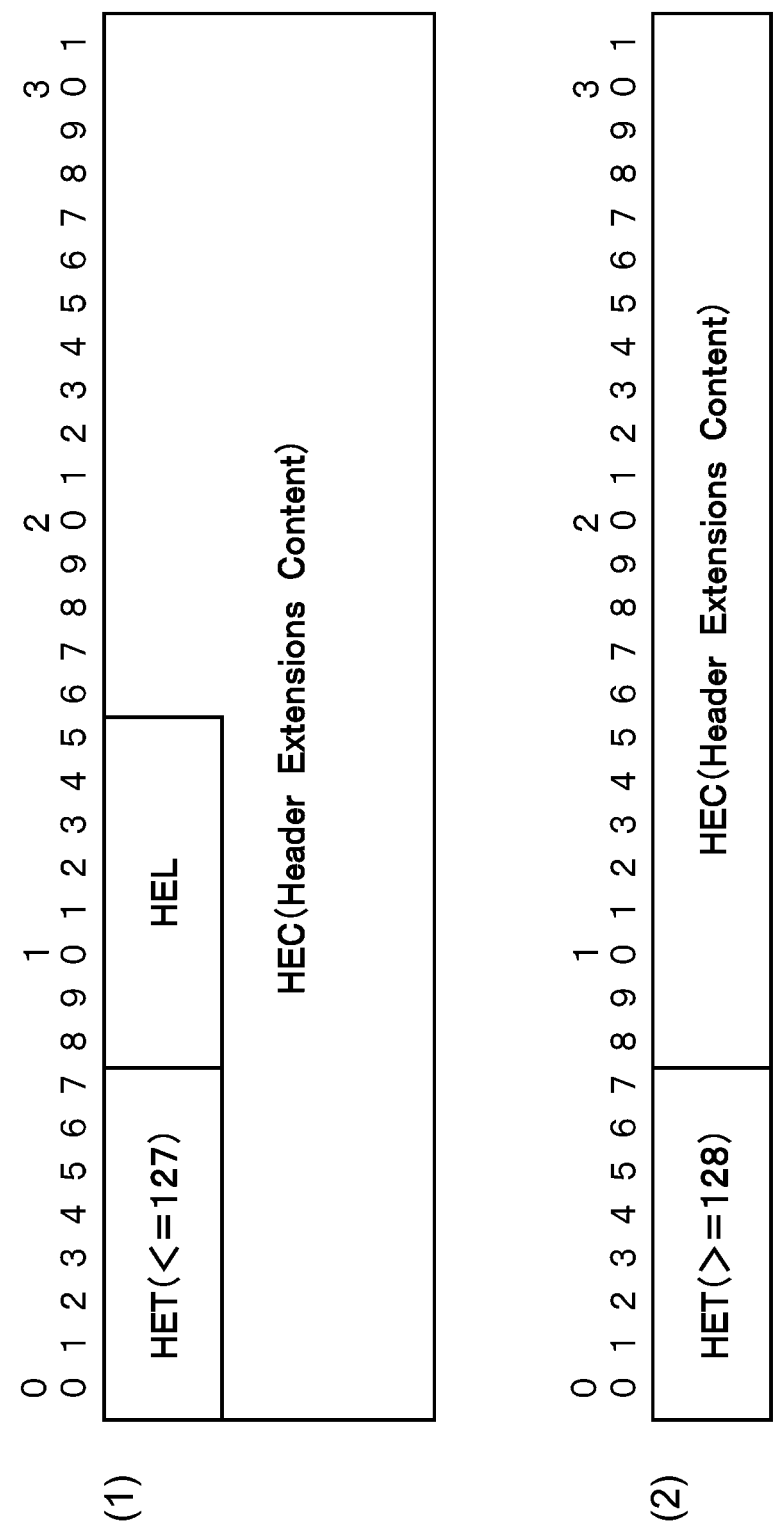

FIG. 18

| | FIELD | SIZE (bit) | SET VALUES |
|---|---|---|---|
| (a) | EXTENSION HEADER IDENTIFICATION INFORMATION (HET) | 8 | 200 (HEADER TYPE) |
| (b) HEC | SEGMENT IDENTIFICATION INFORMATION (Initialization Segment Identifier) | 8 | INITIALIZATION SEGMENT=1, OTHERS=0 |
| (c) | IN-GOP LOCATION IDENTIFICATION INFORMATION (SubGOPIndicator) | 8 | START POSITION IN GOP (StartofGOP)=1 MIDDLE POSITION IN GOP (MiddleOfGOP)=2 END POSITION IN GOP (EndOfGOP)=3 |

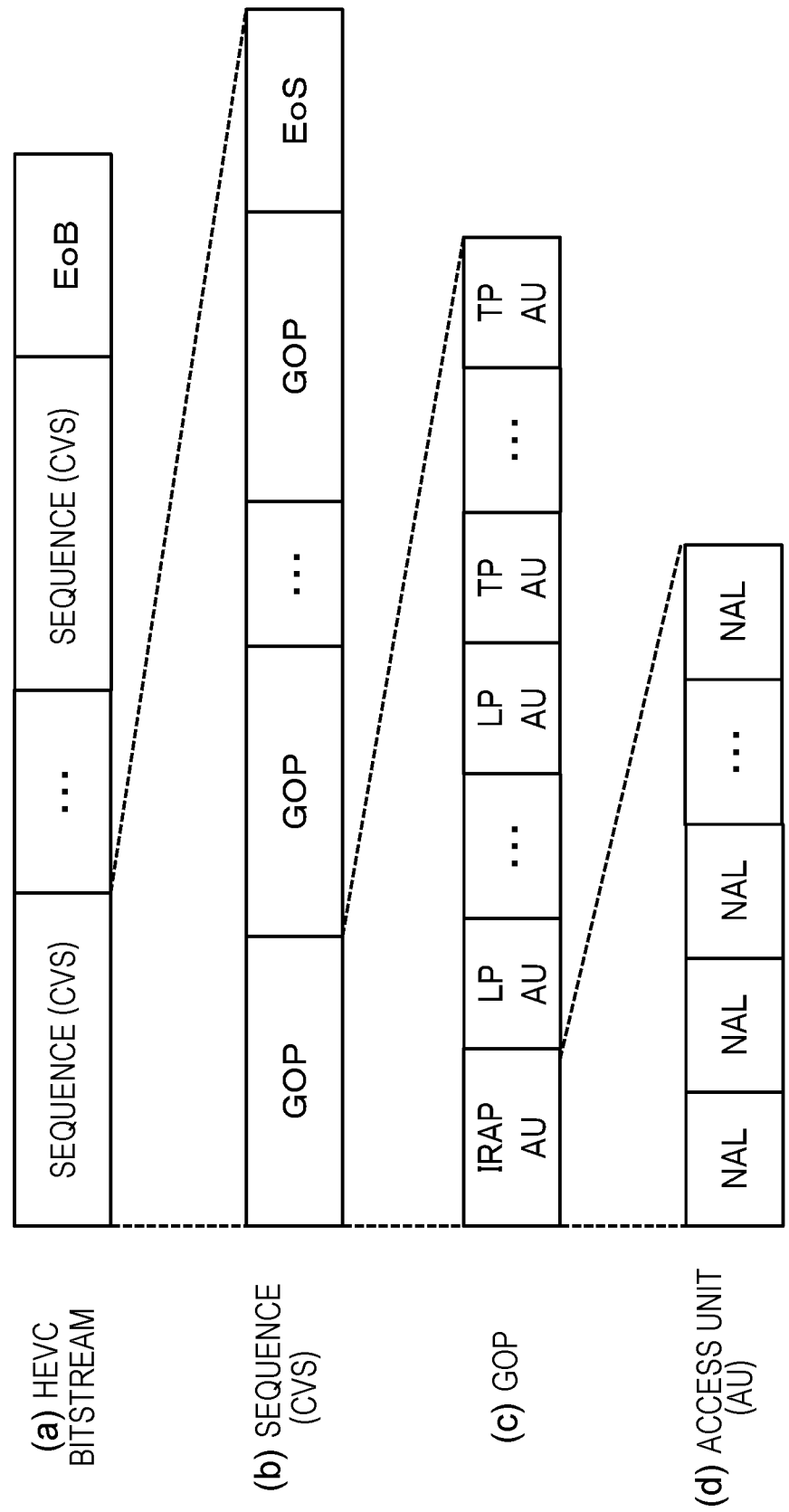

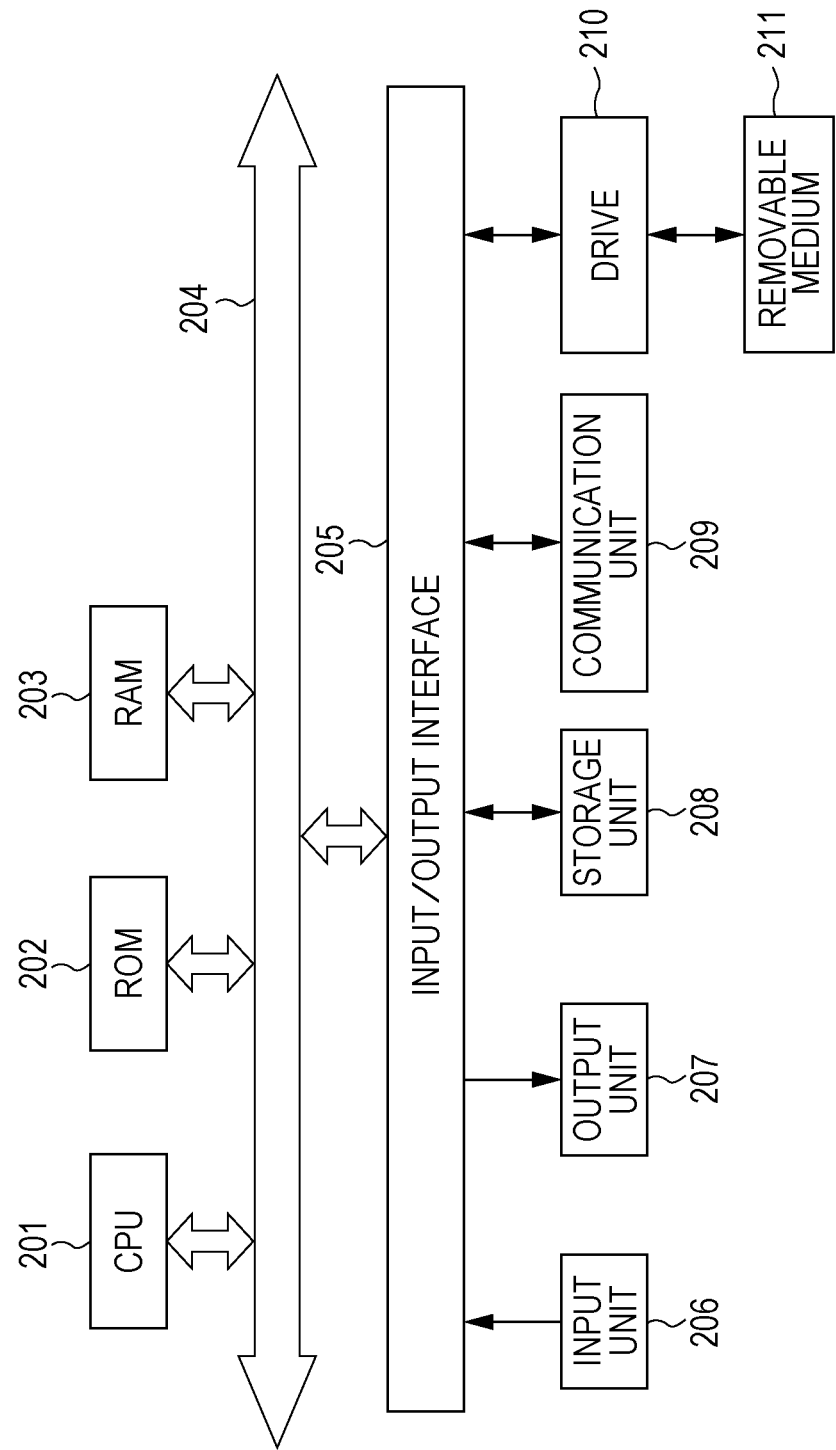

COMMUNICATION DEVICES, COMMUNICATION DATA GENERATION METHOD, AND COMMUNICATION DATA PROCESSING METHOD

TECHNICAL FIELD

The present disclosure relates to communication devices, a communication data generation method, and a communication data processing method. More particularly, the present disclosure relates to a communication device that performs data transmission or reception via broadcast waves or a network, for example, a communication data generation method, and a communication data processing method.

BACKGROUND ART

Over The Top (OTT) has been known as a data distribution system that enabled distribution of content such as image data and audio data, regardless of the service scheme of each telecommunication carrier. Content to be distributed by OTT is called OTT content, and image (video) data distribution services using OTT are called OTT videos or Over The Top Videos (OTT-V).

Dynamic Adaptive Streaming over HTTP (DASH), for example, is used as the fundamental technology in data streaming distribution compliant with OTT-V. DASH is standards for adaptive streaming technologies using the HyperText Transfer Protocol (HTTP) protocol.

In adaptive streaming, a content distribution server creates and holds fragmented files of video content with different bit rates, and a manifest file storing the attribute information and the URLs thereof, to enable various clients to reproduce distributed content.

A client obtains the manifest file from the server, selects content with the optimum bit rate for the size of the display unit of its own device and the available communication band, and receives and reproduces the selected content. The bit rate can be dynamically changed with fluctuation of the network band. Accordingly, on the client side, the optimum content to be received can be changed in accordance with situations, and video content reproduction with reduced image discontinuity is realized. Adaptive streaming is disclosed in Patent Document 1 (JP 2011-87103 A), for example.

MPEG-DASH standards have been developed as standards that set the specifications for performing streaming distribution of Moving Picture Expert Group (MPEG)-encoded videos and audio data in accordance with the above mentioned DASH.

The MPEG-DASH standards include the following two sets of standards:

(a) the standards regarding manifest files (MPD: Media Presentation Description) for writing metadata that is the control information for video and audio files; and (b) the standards regarding the file formats (segment formats) for video content transmission.

In a case where streaming distribution of MPEG data is performed in accordance with DASH, processing is performed in accordance with the MPEG-DAH standards.

However, DASH, which is the standards for adaptive streaming technologies, is based on the point-to-point HTTP streaming technology for one-to-one communication processing.

Therefore, in the case of streaming distribution of content (a program) such as a live sports broadcast that might be simultaneously viewed by a large number of clients, support by Content Delivery Network (CDN) is necessary.

However, to construct point-to-point HTTP streaming using CDN, there are cost-related restrictions, and it is difficult to realize scalability compatible with broadcast distribution. As described above, DASH uses an HTTP-based streaming protocol, and is not suited for distribution of content to be simultaneously viewed by a large number of clients as in broadcast distribution.

CITATION LIST

Patent Document

Patent Document 1: JP 2011-87103 A

SUMMARY OF THE INVENTION

Problems to be Solved by the Invention

The present disclosure aims to provide communication devices, a communication data generation method, and a communication data processing method that simultaneously provide content to a large number of clients in content distribution using an HTTP-based streaming protocol, and realize real-time reproduction at each client without long delay.

Solutions to Problems

A first aspect of the present disclosure lies in a communication device including:

a data processing unit that generates a sub GOP media segment as packet-stored data, the sub GOP media segment storing media data including only part of constituent data of a Group of Pictures (GOP) as a processing unit of encoded data, and metadata corresponding to the media data, and generates a packet having an in-GOP location identifier recorded as packet additional information therein, the in-GOP location identifier indicating the in-GOP location of the media data stored in the sub GOP media segment; and a communication unit that transmits the packet generated by the data processing unit.

Moreover, in an embodiment of the communication device of the present disclosure, the data processing unit generates a sub GOP media segment as packet-stored data, the sub GOP media segment storing media data including one or more NAL units and metadata corresponding to the media data, the one or more NAL units being constituent data of the GOP.

Moreover, in an embodiment of the communication device of the present disclosure, the data processing unit generates a packet having segment identification information recorded as packet additional information therein, the segment identification information enabling determination as to whether the packet-stored segment is an initialization segment not storing the media data or whether the packet-stored segment is a media segment storing the media data.

Moreover, in an embodiment of the communication device of the present disclosure, the data processing unit generates an in-GOP location identifier as packet additional information, the in-GOP location identifier enabling determination as to in which one of a start position, a middle position, and an end position in the GOP the media data stored in the sub GOP media segment is located.

Moreover, in an embodiment of the communication device of the present disclosure, the data processing unit records the additional information in an HTTP header in the generated packet.

Moreover, in an embodiment of the communication device of the present disclosure, the data processing unit records the additional information in an extension header in the generated packet.

Moreover, in an embodiment of the communication device of the present disclosure, the data processing unit records the additional information in an LCT header in the generated packet.

Moreover, in an embodiment of the communication device of the present disclosure, the communication unit transmits the packet generated by the data processing unit through broadcast distribution via broadcast waves, or through multicast distribution.

Moreover, a second aspect of the present disclosure lies in a communication device including: a communication unit that handles a sub GOP media segment as packet-stored data, the sub GOP media segment storing media data including only part of constituent data of a Group of Pictures (GOP) as a processing unit of encoded data, and metadata corresponding to the media data, and receives a packet having an in-GOP location identifier recorded as packet additional information therein, the in-GOP location identifier indicating the in-GOP location of the media data stored in the sub GOP media segment; and a data processing unit that inputs the packet received by the communication unit, and performs processing.

Moreover, in an embodiment of the communication device of the present disclosure, the data processing unit arranges the GOP constituent data dispersed and stored in received packets and reconstructs GOP data, by referring to the in-GOP location identifiers recorded in the received packets.

Moreover, in an embodiment of the communication device of the present disclosure, the communication unit receives a packet storing a sub GOP media segment, the sub GOP media segment storing media data including one or more NAL units and metadata corresponding to the media data, the one or more NAL units being constituent data of the GOP, and the data processing unit acquires the media data including the one or more NAL units from the received packet, and arranges NAL units dispersed and stored in received packets and reconstructs GOP data, by referring to the in-GOP location identifiers recorded in the received packets.

Moreover, in an embodiment of the communication device of the present disclosure, the communication unit receives a packet having segment identification information recorded as packet additional information therein, the segment identification information enabling determination as to whether the packet-stored segment is an initialization segment not storing the media data or whether the packet-stored segment is a media segment containing the media data, and the data processing unit acquires the segment identification information from the additional information recorded in the received packet, determines the type of the segment stored in the received packet, and performs processing in accordance with a result of the determination.

Moreover, in an embodiment of the communication device of the present disclosure, the communication unit receives a packet having an in-GOP location identifier set as packet additional information, the in-GOP location identifier enabling determination as to in which one of a start position, a middle position, and an end position in the GOP the media data stored in the sub GOP media segment is located, and the data processing unit determines in which one of the start position, the middle position, and the end position in the GOP the media data stored in the sub GOP media segment is located based on the in-GOP location identifier recorded in the received packet.

Moreover, in an embodiment of the communication device of the present disclosure, the communication unit receives a packet having the packet additional information recorded in an HTTP header, and the data processing unit acquires the packet additional information from the HTTP header of the received packet.

Moreover, in an embodiment of the communication device of the present disclosure, the communication unit receives a packet having the packet additional information recorded in an extension header, and the data processing unit acquires the packet additional information from the extension header of the received packet.

Moreover, in an embodiment of the communication device of the present disclosure, the communication unit receives a packet having the packet additional information recorded in an LCT header, and the data processing unit acquires the packet additional information from the LCT header of the received packet.

Moreover, in an embodiment of the communication device of the present disclosure, the communication unit receives the packet via broadcast waves.

Moreover, a third aspect of the present disclosure lies in a communication data generation method implemented in a data transmission device, the communication data generation method including:

generating a sub GOP media segment as packet-stored data, the sub GOP media segment storing media data including only part of constituent data of a Group of Pictures (GOP) as a processing unit of encoded data, and metadata corresponding to the media data, and generating a packet having an in-GOP location identifier recorded as packet additional information therein, the in-GOP location identifier indicating the in-GOP location of the media data stored in the sub GOP media segment, the generating the sub GOP media segment and the generating the packet being carried out by a data processing unit.

Moreover, a fourth aspect of the present disclosure lies in a communication data processing method implemented in a data reception device, the communication data processing method including:

handling a sub GOP media segment as packet-stored data, the sub GOP media segment storing media data including only part of constituent data of a Group of Pictures (GOP) as a processing unit of encoded data, and metadata corresponding to the media data, the handling the sub GOP media segment being carried out by a communication unit;

receiving a packet having an in-GOP location identifier recorded as packet additional information therein, the in-GOP location identifier indicating the in-GOP location of the media data stored in the sub GOP media segment, the receiving the packet being carried out by the communication unit; and inputting the packet received by the communication unit, and performing processing, the inputting the packet and the performing the processing being carried out by a data processing unit.

Other objects, features, and advantages of the present disclosure will be made apparent by the embodiments of the present disclosure described below and the detailed descriptions with reference to the accompanying drawings. In this specification, a system is a logical assembly of devices, and does not necessarily mean devices with different structures incorporated into one housing.

Effects of the Invention

With a structure of an embodiment of the present disclosure, devices and methods that enable content distribution of data units generated by dividing a GOP, and GOP reconstruction and reproduction on the reception device side are realized.

Specifically, a transmission device generates a sub GOP media segment as packet-stored data, the sub GOP media segment storing media data including only part of constituent data of a Group of Pictures (GOP) as a processing unit of encoded data and metadata corresponding to the media data, and generates and transmits a packet having an in-GOP location identifier recorded as packet additional information therein, the in-GOP location identifier indicating the in-GOP location of the media data stored in the sub GOP media segment. A reception device arranges media data dispersed and stored in packets by referring to the in-GOP location identifiers stored in received packets, and reconstructs and decodes a GOP.

With this structure, devices and methods that enable content distribution of data units generated by dividing a GOP, and GOP reconstruction and reproduction on the reception device side are realized.

The advantageous effects described in this specification are merely examples, and the advantageous effects of the present technology are not limited to them and may include additional effects.

BRIEF DESCRIPTION OF DRAWINGS

FIG. 6 is a diagram for explaining example structures of HTTP packets each having an HTTP header set in a sub GOP media segment.

FIG. 10 is a diagram for explaining example structures of IP packets.

FIG. 15 is a diagram for explaining an embodiment in which additional information is recorded in an extension header.

FIG. 17 is a diagram for explaining the structure of data recorded in the header extension portion of an LCT header.

FIG. 18 is a diagram for explaining the data recorded in the header extension portion of an LCT header.

FIG. 19 is a diagram for explaining the structure of HEVC encoded data.

FIG. 20 is a diagram for explaining an example hardware configuration of a communication device.

MODES FOR CARRYING OUT THE INVENTION

Figure 1:
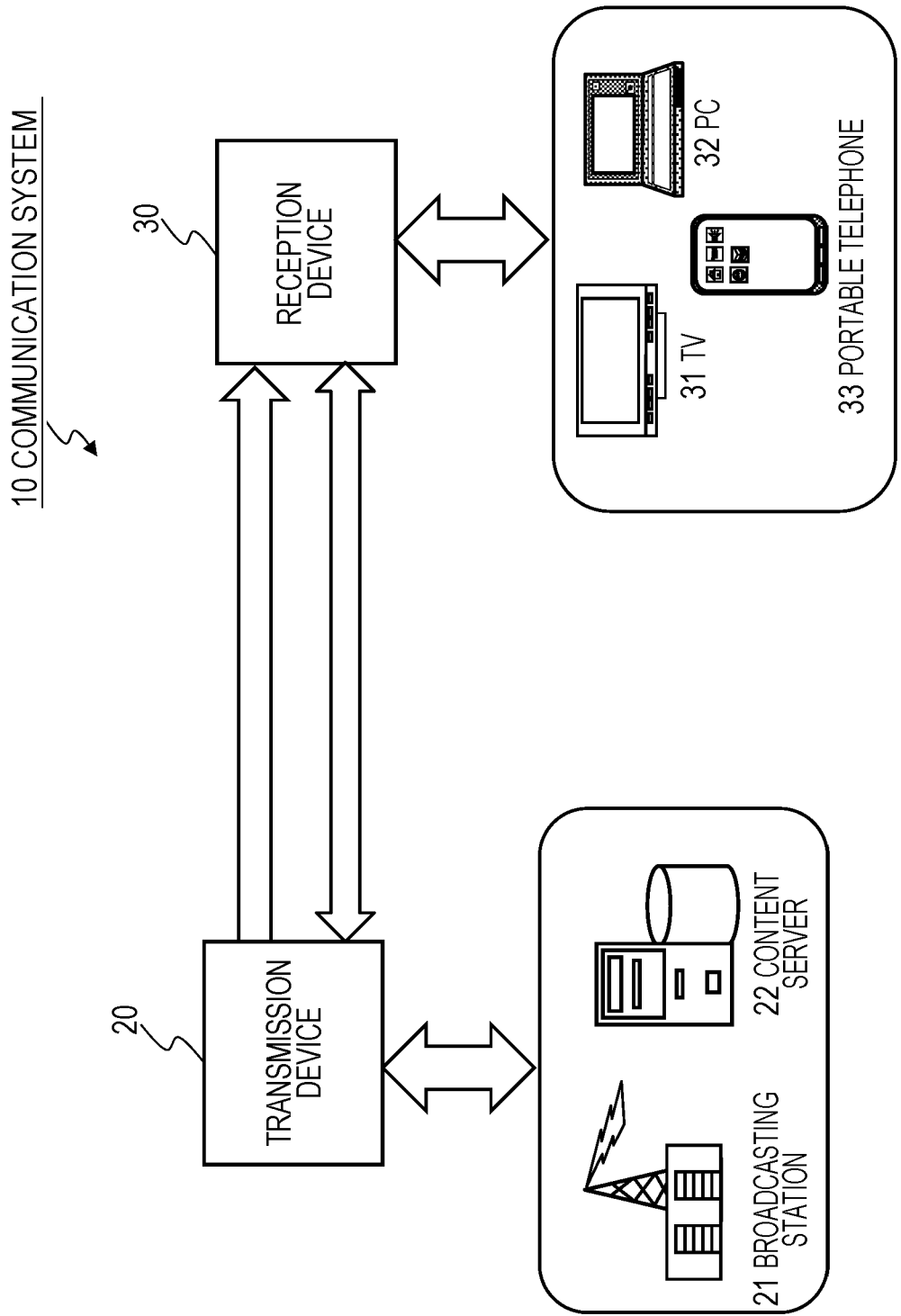
FIG. 1 is a diagram for explaining an example configuration of a communication system that performs processing according to the present disclosure.

The following is a detailed description of communication devices, communication data generation methods, and communication data processing methods according to the present disclosure, with reference to the drawings. Explanation will be made in the following order.

1. Example configuration of a communication system
2. Problem in simultaneous-type content distribution
3. Details of a transmission data fragmentation process
4. Embodiment in which additional information is recorded in the HTTP header
5. Structures of packets
6. Structures of and processes to be performed by the transmission device and the reception device
7. Process sequences of the transmission device and the reception device
8. Embodiment in which additional information is recorded in an extension header
9. Embodiment in which additional information is recorded in an LCT header
10. Example applications to HEVC encoded data
11. Example hardware configurations of respective devices
12. Summary of the structures of the present disclosure 1. Example Configuration of a Communication System Referring first to FIG. 1, an example configuration of a communication system that performs processing according to the present disclosure is described.

As shown in FIG. 1, a communication system 10 includes a transmission device 20 as a communication device that transmits content such as image data and audio data, and a reception device 30 as a communication device that receives content transmitted from the transmission device 20.

The transmission device 20 is a device on the side that provides content, to be specific, such as a broadcasting station 21 and a content server 22.

The reception device 30 is a general user client device formed with, to be specific, a television receiver 31, a PC 32, or a mobile terminal 33, for example.

Data communication between the transmission device 20 and the reception device 30 is performed as bidirectional communication via a network such as the Internet, and/or unidirectional communication using broadcast waves or the like.

Content transmission from the transmission device 20 to the reception device 30 is performed in accordance with the MPEG-DASH standards, which are adaptive streaming technology standards.

As described above, the MPEG-DASH standards include the following two sets of standards:

(a) the standards regarding manifest files (MPD: Media Presentation Description) for writing metadata that is the control information for video and audio files; and (b) the standards regarding the file formats (segment formats) for video content transmission.

Content distribution from the transmission device 20 to the reception device 30 is performed in accordance with the above MPEG-DASH standards.

The transmission device 20 encodes content data, and generates a data file containing the encoded data and metadata of the encoded data. The encoding process is performed in accordance with the MP4 file format specified in MPEG, for example. In a case where the transmission device 20 generates an MP4 data file, the file of encoded data is called "mdat", and the metadata is called "moov", "moof", or the like.

These encoded data will be described later in detail.

Content to be provided to the reception device 30 by the transmission device 20 may be music data, video data of a movie, a television program, a video, a photograph, a document, a picture, or a diagram, or other various kinds of data such as a game or software.

Figure 2:
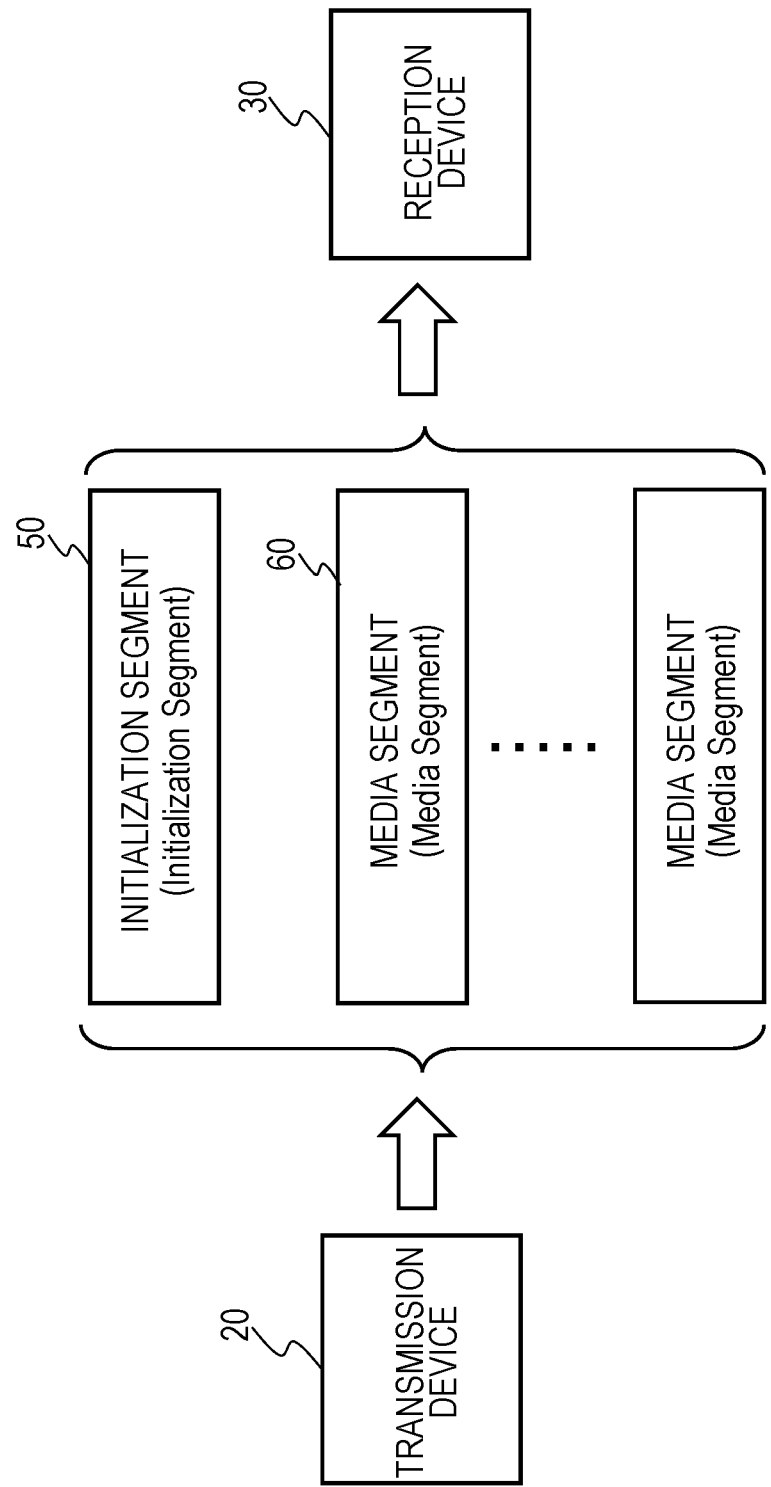
FIG. 2 is a diagram for explaining data transmitted from a transmission device.

Referring now to FIG. 2, data transmitted from the transmission device 20 is described.

The transmission device 20, which performs data transmission in accordance with the MPEG-DASH standards, transmits an initialization segment (Initialization Segment) 50 and media segments (Media Segments) 60, which are contained in a packet, to the reception device 30, as shown in FIG. 2. Each of these segments is called a DASH segment.

Each of the media segments 60 is a segment storing MPEG-encoded content data that is divided.

The initialization segment 50 is the segment storing the initialization information such as codec setting information required when the content in the media segments 60 is reproduced on the side of the reception device 30.

The transmission device 20 divides and stores the content of a movie or a television program into a number of media segments 60, and then sequentially transmits the content.

The transmission device 20 stores the initialization segment 50 and the media segments 60 shown in FIG. 2 into an HTTP packet. The transmission device 20 further generates an IP packet storing the HTTP packet, and then transmits the IP packet. The structures of the transmission packets will be described later in detail.

The reception device 30 shown in FIG. 2 first receives the single initialization segment 50, and performs setting and the like on a codec or the like in accordance with the setting information contained in the initialization segment. The reception device 30 then sequentially receives the media segments 60, and performs reproduction by decoding the data in order of reproduction.

2. Problem in Simultaneous-Type Content Deliver

As described above, DASH, which is adaptive streaming technology standards, is based on point-to-point HTTP streaming, and is not suited for simultaneous-type content deliver that allows a large number of clients to view the same content at the same time.

However, it is considered that, in conjunction with multicast or broadcast (MC/BC), content can be simultaneously provided to a large number of clients (reception devices) without delay.

Examples of transport protocols that can be applied to multicast or broadcast (MC/BC) streaming include Real-time Transport Protocol (RTP) and File Delivery over Unidirectional Transport (FLUTE).

Figure 3:
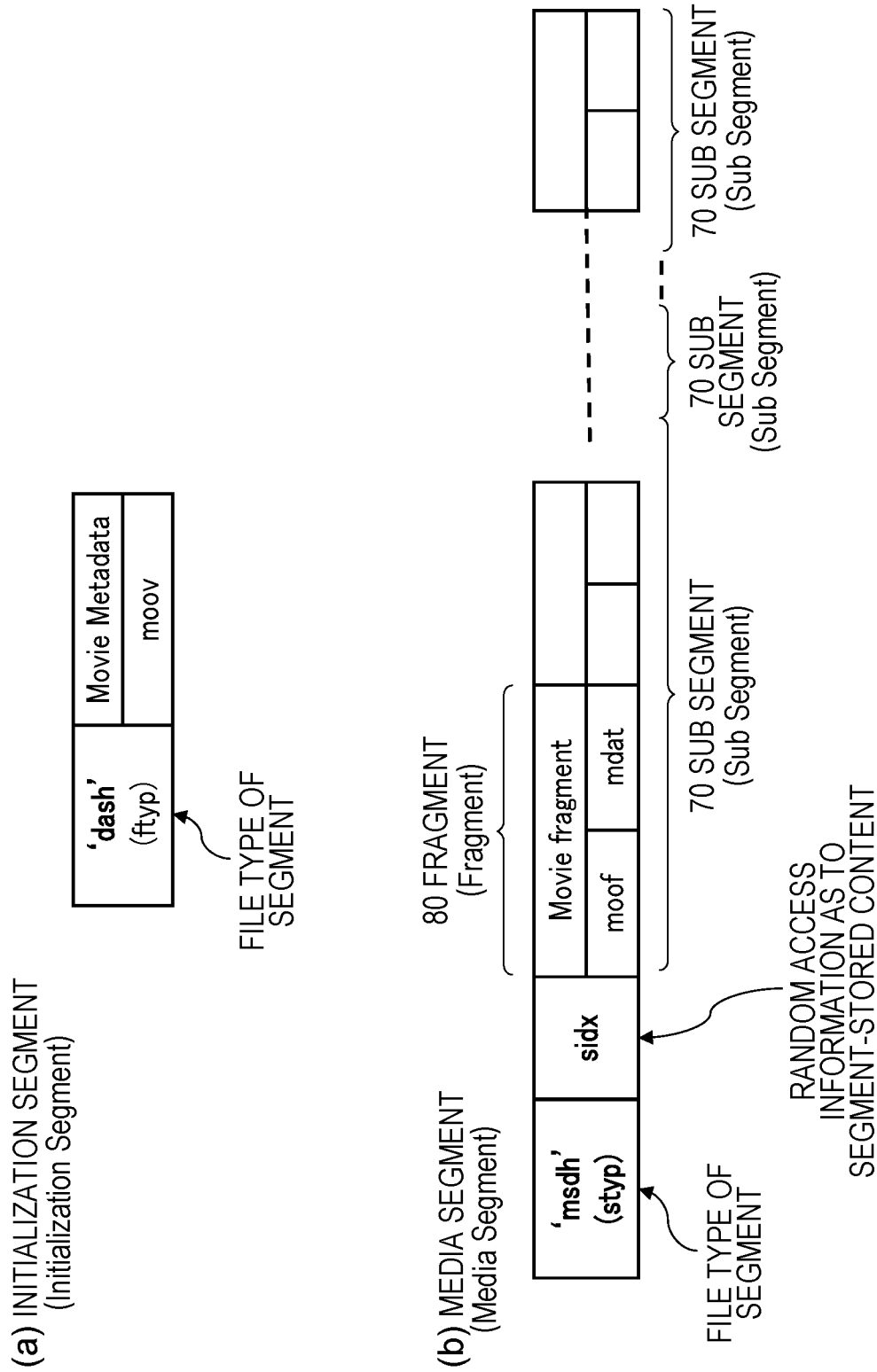
FIG. 3 is a diagram for explaining example structures of DASH segments.

Referring now to FIG. 3, example structures of DASH segments that can be used in a case where content stream distribution using the FLUTE protocol is conducted in accordance with HTTP-streaming-based DASH standards are described.

As described above with reference to FIG. 2, DASH segments are classified into the two types: (a) initialization segments (Initialization Segments), and (b) media segments (Media Segments).

An (a) initialization segment (Initialization Segment) is a segment that stores initialization data such as setting information required in performing content reproduction, including the decoder settings in the reception device 30 and the like.

A (b) media segment (Media Segment) is a segment that stores encoded content to be reproduced.

As shown in FIG. 3, the (a) initialization segment contains the following information:

(a1) header information (dash) formed with the file type information about the segment and the like; and (a2) metadata (moov) including initialization information such as codec (encoding mode) information about media data (mdat) that is the encoded content to be transmitted with the media segment.

Meanwhile, the (b) media segment contains the following information as shown in FIG. 3:

(b1) header information (msdh) formed with the file type information and the like about the segment;

(b2) access information (sidx) indicating the boundary information about the sub segments (Sub-Segments) stored in the media segment, a random access point of the media data (mdat) that is the encoded content stored in the media segment, and the like; and (b3) sub segments (Sub-Segments) 70.

The sub segments (Sub-Segments) 70 are formed with one or more fragments (Fragments) 80.

A fragment (Fragment) 80 contains the following data:

media data (mdat) that is encoded content to be reproduced; and metadata (moof) corresponding to the media data (mdat).

The random access point recorded in the access information (sidx) in the (b) media segment is called a SAP (Stream Access Point) according to DASH.

A SAP indicates the location of the first byte of the first picture in an image sequence that can reset all the states necessary for decoding a stream, for example. Specifically, a SAP is the information indicating the location of the I picture of MPEG data, for example.

The presentation time as the reproduction time information about the media data (mdat) stored in the fragments and the like are recorded in the metadata (moof) corresponding to the media data (mdat) stored in the fragments (Fragments) 80.

The media data (mdat) stored in one fragment 80 is normally set in a processing unit (chunk) in content streaming to be controlled by DASH at the present time. A processing unit (chunk) is a Group of Pictures (GOP) as a processing unit in Moving Picture Expert Group (MPEG) encoding.

A GOP is operated as data having a reproduction time of approximately 0.5 to 2 seconds in many cases.

Where the media data (mdat) stored in one fragment 80 is data of one GOP unit, delay might occur in data distribution or a reproduction process, and some trouble might occur in real-time reproduction.

In a case where a live image is distributed, for example, the transmission device 20 performs an encoding process on live image data that is input from a camera, and sequentially generates media segments 60. In a case where the media data (mdat) stored in each fragment 80 in the media segments 60 is encoded data of a GOP unit, the transmission device 30 generates the media data (mdat) that is the encoded data of GOP units, and after that, generates metadata (moof) in which attribute information such as the presentation time of the generated media data (mdat) and the like are written.

Therefore, if the respective sets of data are generated in this sequence, the metadata (moof) of each GOP cannot be generated until after the data range of the encoded data of each GOP is determined.

In view of this, metadata (moof) generation is performed after the data range of the media data (mdat) is determined, and the process of generating each set of metadata (moof) has to wait until the time equivalent to the time of one GOP unit (0.5 to 2 seconds) has passed.

Figure 4:
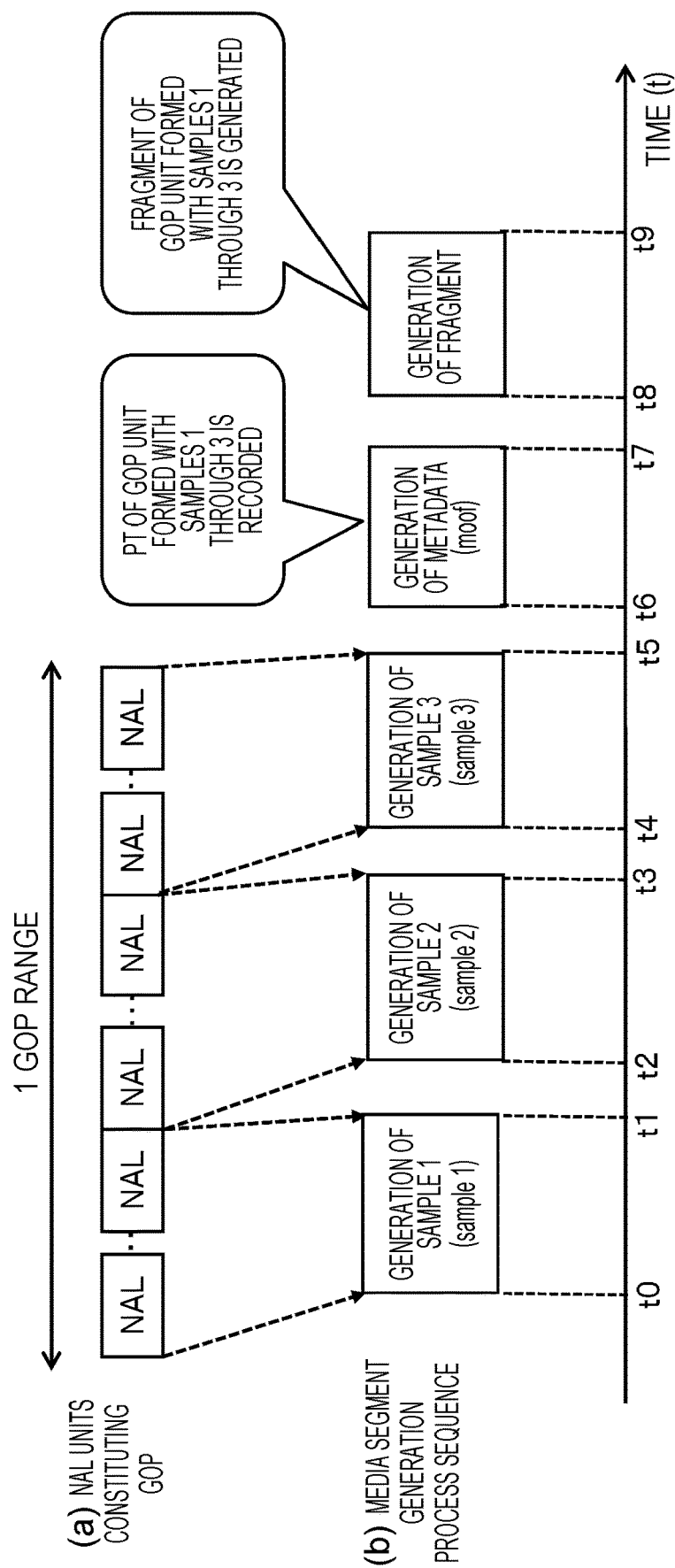
FIG. 4 is a diagram for explaining a fragment generation process sequence.

Referring now to FIG. 4, the fragment generation sequence in a case where the media data (mdat) stored in the fragments 80 constituting a media segment 60 is encoded data of GOP units is described.

The example shown in FIG. 4 is an example sequence in a case where the media data (mdat) stored in the media segment 60 is stored in accordance with the MP4 file format (encoding format) specified in MPEG.

The data portions of the MP4 file format are divided into samples as the basic storage units. Moreover, each of the samples is formed with one or more NAL units. NAL units are fragmented data of slice units, for example, of MPEG encoded data.

As shown in FIG. 4(*a*), sets of encoded data corresponding to one GOP are formed with NAL units.

FIG. 4 shows (a) the NAL units forming a GOP in the upper half of the drawing, and (b) the fragment generation process sequence in the lower half.

In the lowermost level of (b) the fragment generation process sequence, the time axis is shown. Time passes from left to right, and the transmission device 20 generates fragments by performing respective processes in accordance with the time axis.

The transmission device generates a media segment storing the generated fragments, then generates an HTTP packet storing the media segment, further generates an IP packet storing the HTTP packet, and transmits the IP packet.

The fragment generation process sequence shown in FIG. 4(*b*) is now described.

In the sequence described below, the transmission device 20 generates fragments storing encoded data compliant with the MP4 file format.

Time from t0 to t1: a sample 1 storing NAL units of a GOP is generated.

Time from t2 to t3: a sample 2 storing NAL units of the GOP is generated.

Time from t4 to t5: a sample 3 storing NAL units of the GOP is generated.

At this point, generation of the samples storing all the NAL units constituting one GOP is completed.

These samples 1 through 3 are set as the media data (mdat) in a fragment of the media segment.

Time from t6 to t7: metadata (moof) that is the attribute information about the GOP encoded data stored in the samples 1 through 3 is generated.

Time from t8 to t9: a fragment is generated by combining the media data (mdat) formed with the samples 1 through 3, and the metadata (moof) of the samples 1 through 3.

After that, the transmission device 20 generates a media segment containing the fragment generated through the above described process, generates a packet containing the media segment as the payload, and transmits the packet to the reception device 30.

When generating a fragment, the transmission device 20 needs to check the reproduction time and the like of the media data (mdat) of each of the GOPs to be stored in the fragment, generate the attribute information of each set of GOP data, such as the presentation time corresponding to the reproduction time, and records the attribute information in the metadata (moof).

At present, image data to be distributed is mostly image data compatible with Hi-Vision. However, as image quality will be improved further in the future, it is predicted that data distribution involving a large amount of data, such as 4K images, will increase. To cope with such large-capacity data distribution, the bit rate in streaming might become higher.

As the amount of data increases with improvement in image quality, the amount of data of each GOP also increases. Therefore, with a structure that sequentially generates and transmits fragments of GOPs as described above with reference to FIG. 4, the processing intervals on the transmission side become longer. The amount of data per transmission data unit also becomes larger. Therefore, in a case where a sufficient communication band cannot be secured, there is a possibility that transmission delay occurs in network transmission.

The packet reception intervals on the reception device side also become longer, the amount of received data per packet increases, and the amount of buffered data required on the reception device side also increases. Moreover, if a retransmission process is performed when a packet reception error occurs, the amount of delay increases significantly, and the possibility that real-time reproduction will fail becomes higher.

3. Details of a Transmission Data Fragmentation Process

To solve the above problem, data to be transmitted from the transmission device 20 to the reception device 30 is fragmented, so that one transmission packet or the amount of transmission data per unit is reduced. An example of such a structure is described below.

In the fragment generation sequence shown in FIG. 4, the media data (mdat) set in a fragment is the data of one GOP, and metadata (moof) corresponding to the media data (mdat)

of the one GOP is generated. That is, each set of metadata (moof) is metadata corresponding to the media data (mdat) of one GOP.

In the sequence shown in FIG. 4, the time to generate metadata (moof) is determined in accordance with the amount of data of the one GOP. Therefore, if the amount of data contained in the one GOP becomes larger, the time to generate metadata (moof) is delayed, resulting in delay in the fragment generation process, the media segment generation process, and the transmission packet generation process. This result also causes an increase in the amount of data per packet, and the possibility of distribution delay becomes higher.

Figure 5:
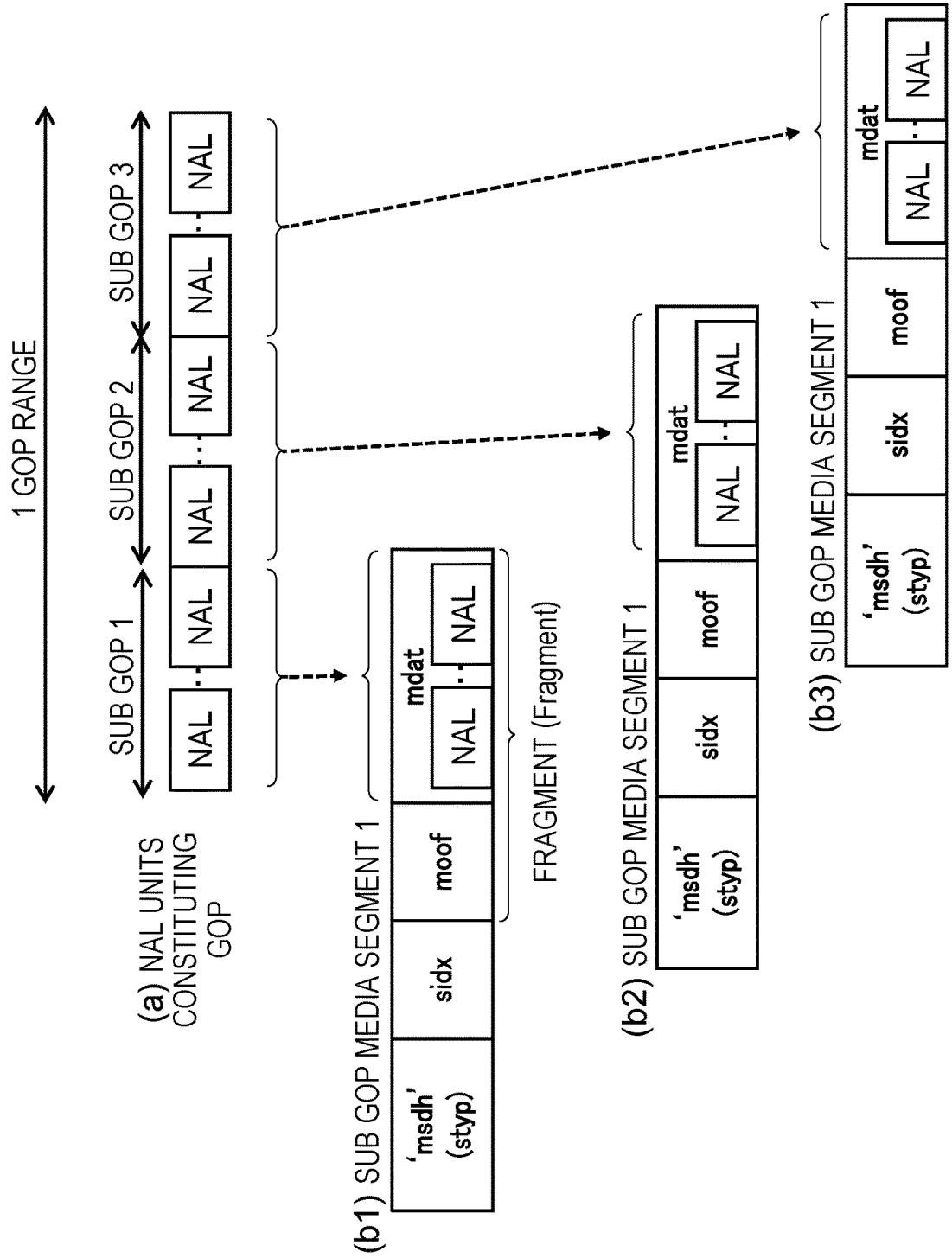
FIG. 5 is a diagram for explaining an example structure in which the media data (mdat) in a fragment is not the data of one GOP, but fragmented data of one GOP.

In a structure for preventing such a situation, the media data (mdat) in a fragment is not the data of one GOP, but fragmented data of one GOP. Referring now to FIG. 5, an example of this structure is described.

FIG. 5 shows an example where the media data (mdat) stored in a fragment is not the data of one GOP, but fragmented data of one GOP, or more specifically, one NAL unit or NAL units that are constituent data of one GOP.

Like FIG. 4(a), FIG. 5(a) shows the NAL units constituting a GOP.

FIGS. 5(b1) through 5(b3) are media segments storing the NAL units as the constituent data of this single GOP, the NAL units being dispersed as media data (mdat).

A media segment storing media data (mdat) formed with one or more NAL units that are fragmented data of GOP data, as shown in FIGS. 5(b1) through 5(b3), will be hereinafter referred to as a sub GOP media segment.

Although the data of one GOP is stored in three sub GOP media segments in the example shown in FIG. 5, the number of sub GOP media segments to store the data of one GOP may be any number, as long as it is two or larger.

In each of the sub GOP media segments in FIGS. 5(b1) through 5(b3), media data (mdat) is set as NAL units. However, media data (mdat) may be set as only a single NAL unit.

The transmission device 20 generates the sub GOP media segments shown in FIGS. 5(b1) through 5(b3), sets each of the generated sub GOP media segments in the payload of an independent HTTP packet, and transmits the HTTP packets via a network or broadcast waves.

The metadata (moof) stored in the sub GOP media segments in FIGS. 5(b1) through 5(b3) is metadata formed with the attribute information corresponding to the media data (mdat) stored in the respective sub GOP media segments.

With this setting, the amount of data of each one packet to be transmitted via a network or broadcast waves becomes smaller, and the time required in the process of generating one packet on the transmission device side is shortened. Also, the possibility of packet delay is lowered, and the retransmission process delay at the time of packet loss or the like becomes shorter. As a result, real-time reproduction without errors in the reception device 30 is realized.

Referring now to FIG. 6, example structures of HTTP packets each having an HTTP header set in a sub GOP media segment are described.

FIG. 6 shows examples structures of two HTTP packets.

The difference between the packets shown in (a) and (b) in FIG. 6 is the existence/non-existence of [sidx] storing random access information and the like.

As described above with reference to FIG. 3, sidx is access information indicating the boundary information about the sub segments (Sub-Segments) stored in the media segment, a random access point of the media data (mdat) that is the encoded content stored in the media segment, and the like. According to DASH, the access information is called Stream Access Point (SAP). A SAP indicates the location of the first byte of the first picture in an image sequence that can reset all the states necessary for decoding a stream, for example. Specifically, a SAP corresponds to the location of the I picture of MPEG data, for example.

The HTTP packet shown in FIG. 6(b) is a packet not containing sidx. The HTTP packet shown in FIG. 6(b) does not have picture data serving as an access point contained in the media data (mdat) stored in this packet.

In a case where the data serving as an access point is not contained in the media data (mdat) stored in a packet, the data indicating the access point is also unnecessary. Therefore, sidx is not set in the HTTP packet shown in FIG. 6(b).

In a packet containing a sub GOP media segment storing media data (mdat) including the data serving as an access point, on the other hand, sidx is set as shown in FIG. 6(a).

As described above with reference to FIGS. 5 and 6, in this embodiment, the constituent data of one GOP is divided into packets that are then transmitted.

The reception device 30 sequentially receives those packets, and obtains the GOP constituent data divided and stored in the respective packets. In a case where a decoding process is performed on one GOP, all the GOP constituent data stored in packets needs to be gathered, and the constituent data (NAL units) of the GOP needs to be arranged in the correct order so that the GOP data is reconstructed.

In the description below, an example of setting of additional information for smooth processing on the reception device side, such as information to be used in the GOP reconstruction process, is described.

4. Embodiment in which Additional Information is Recorded in the HTTP Header

First, an embodiment in which additional information for smooth processing on the reception device side, such as information to be used in the GOP reconstruction process, is recorded in the HTTP header of an HTTP packet is described.

Figure 7:
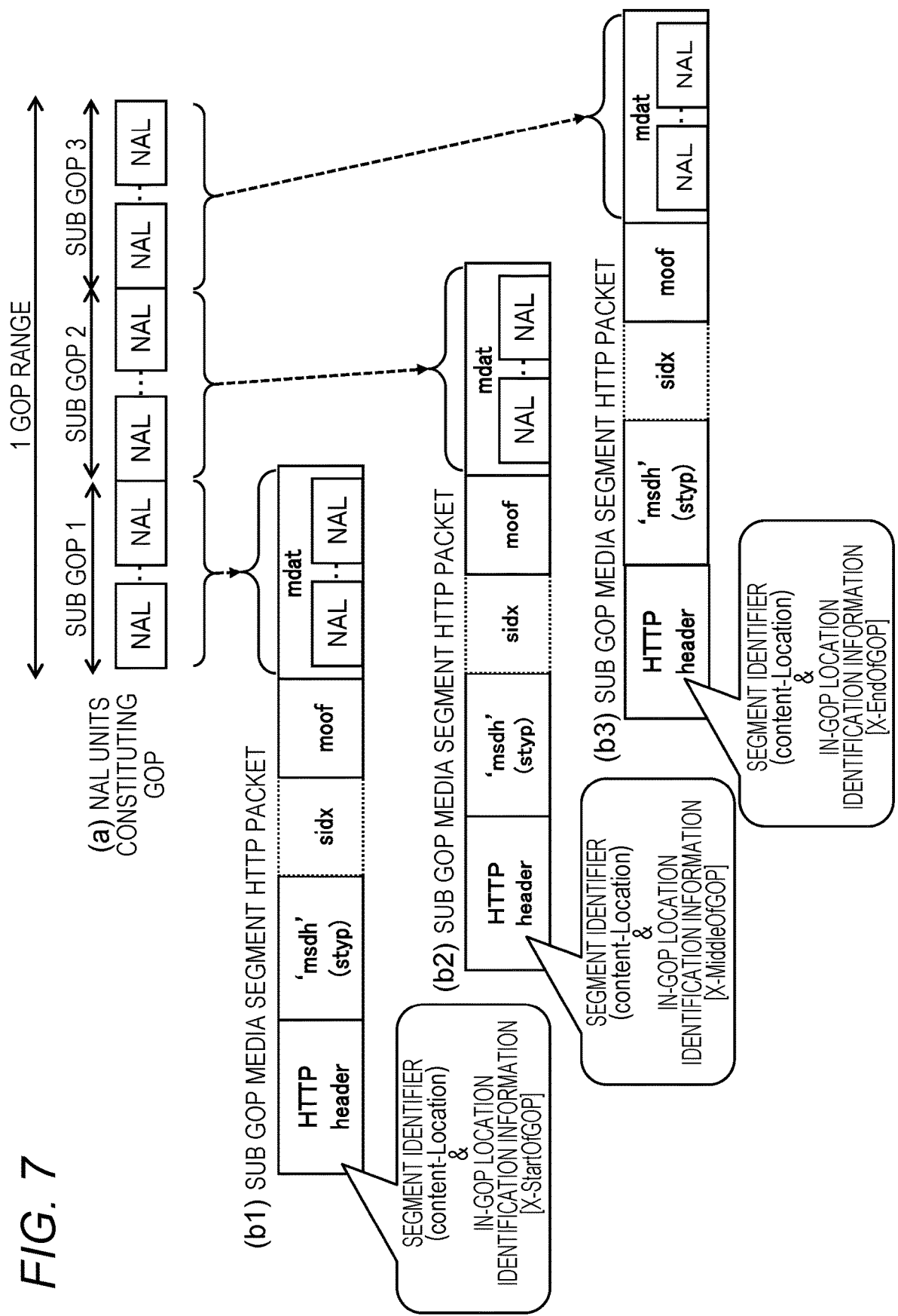
FIG. 7 is a diagram for explaining the information recorded in the HTTP headers of media segment HTTP packets.
Figure 8:
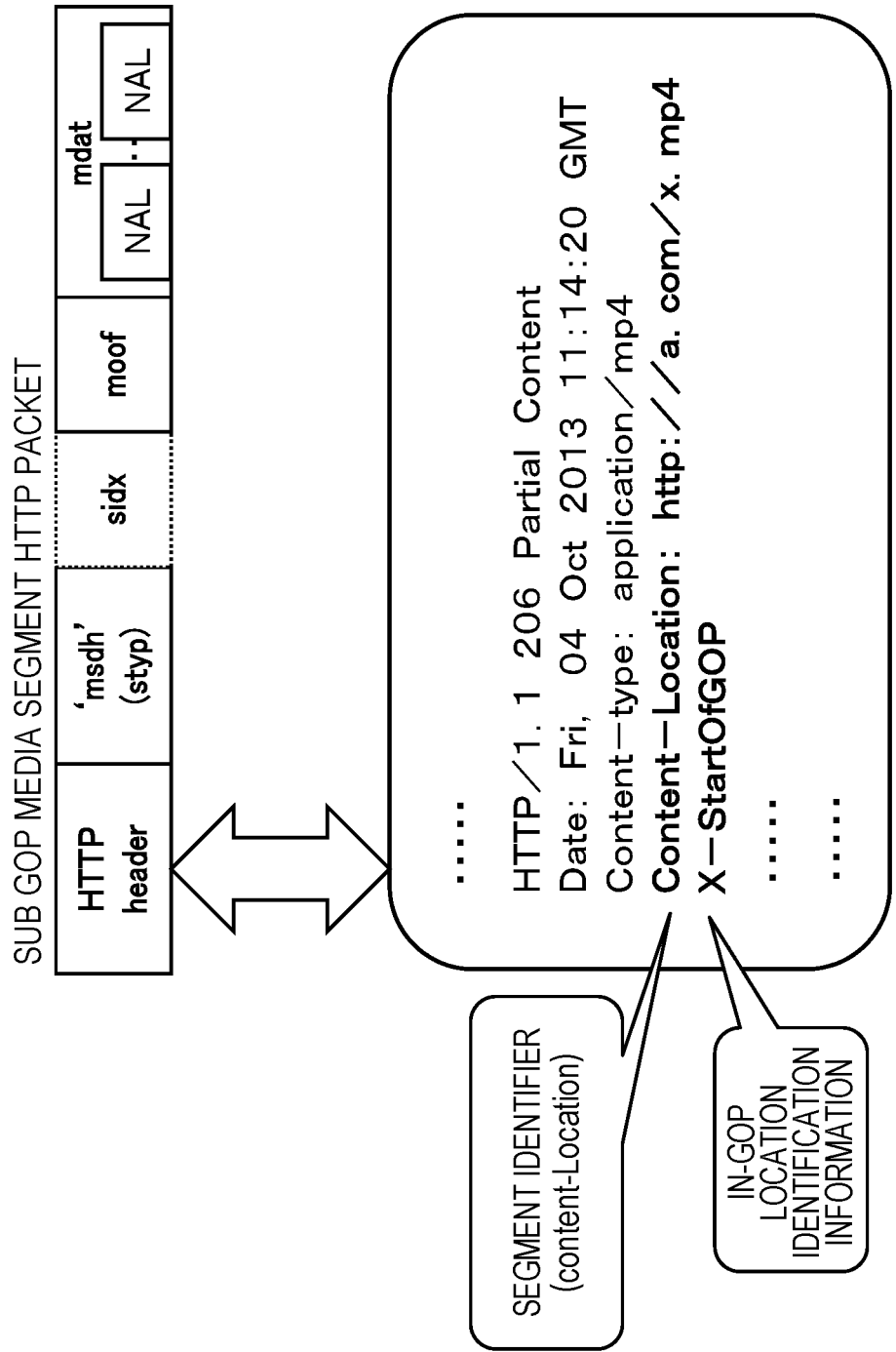
FIG. 8 is a diagram for explaining the information recorded in the HTTP header of a media segment HTTP packet.

Referring to FIGS. 7 and 8, the information recorded in the HTTP header is described.

FIG. 7 shows an example structure of HTTP packets in which the data of one GOP is divided and stores in three sub GOP media segments as in the example case described above with reference to FIG. 5.

As shown in FIG. 7, two kinds of identification information, (1) segment identifier (Content-Location) and
(2) in-GOP location identification information (X-(Start/Middle/End)ofGOP), are recorded in the HTTP header of each of the three HTTP packets.

The (1) segment identifier is data that includes the content location information about the segment stored in the HTTP packet, the type of the segment, and the identification information about the GOP to which the media data (mdat) stored in the packet belongs. Specifically, the location information (access information such as the URL) about the GOP data should be recorded.

The reception device 30 that receives packets can determine that HTTP packets having the same segment identifier (Content-Location) recorded therein are HTTP packets storing media data (mdat) belonging to the same GOP.

The (2) in-GOP location identification information is data that indicates in which position in one GOP the media data (mdat) stored in the HTTP packet is located.

The packet having X-StartofGOP as the in-GOP location identification information is the packet that stores the NAL units in the first area of the GOP data as the media data (mdat).

The packet having X-MiddleofGOP as the in-GOP location identification information is the packet that stores the NAL units in the middle area of the GOP data as the media data (mdat).

The packet having X-EndofGOP as the in-GOP location identification information is the packet that stores the NAL units in the last area of the GOP data as the media data (mdat).

In a case where the data of one GOP is divided into four or more sub GOP media segments, two or more packets having X-MiddleofGOP as the in-GOP location identification information are generated. The in-GOP data arrangement of the media data (mdat) stored in those packets can be determined from the packet header information other than the HTTP headers.

For example, the in-GOP data arrangement can be determined with reference to the packet sequence numbers recorded in the LCT headers of LCT packets storing the HTTP packets. The structure of a transmission packet and the structure of an LCT header will be described later in detail.

Accordingly, in a structure that transmits HTTP packets stored in LCT packets, for example, the in-GOP location identification information set in the HTTP headers may identify only the packet storing the data of the first area in the GOP. That is, only X-StartofGOP may be recorded as the in-GOP location identification information, and the GOP data thereafter may be arranged in accordance with the sequence numbers recorded in the LCT headers.

FIG. 8 shows an example data structure of the HTTP header of an HTTP packet storing a media segment.

As shown in FIG. 8, the HTTP header information shown below as an example is recorded in the HTTP header.

---

"...
HTTP/1.1 206 Partial Content
Date: Fri, 04 Oct 2013 11:14:20 GMT
Content-type: application/mp4
Content-Location: http://a.com/x.mp4
X-StartOfGOP
..."

---

In the above HTTP header information, the segment identifier is "Content-Location: http://a.com/x.mp4".

This segment identifier contains the identification information about the GOP to which the media data (mdat) stored in the HTTP packet belongs. Specifically, the identification information is the location information (access information) about the GOP data.

It is possible to determine that HTTP packets having the same segment identifier (Content-Location) recorded therein are HTTP packets storing media data (mdat) belonging to the same GOP.

In the above HTTP header information, the in-GOP location identification information is "X-StartOfGOP". This in-GOP location identification information is the data that indicates in which position in the one GOP the media data (mdat) stored in the HTTP packet is located.

If the media data (mdat) stored in the HTTP packet is placed in the first area of the GOP, "X-StartOfGOP" is recorded as the in-GOP location identification information in the HTTP header.

If the media data (mdat) stored in the HTTP packet is placed in the middle area of the GOP, "X-MiddleOfGOP" is recorded as the in-GOP location identification information in the HTTP header.

If the media data (mdat) stored in the HTTP packet is placed in the last area of the GOP, "X-EndOfGOP" is recorded as the in-GOP location identification information in the HTTP header.

Figure 9:
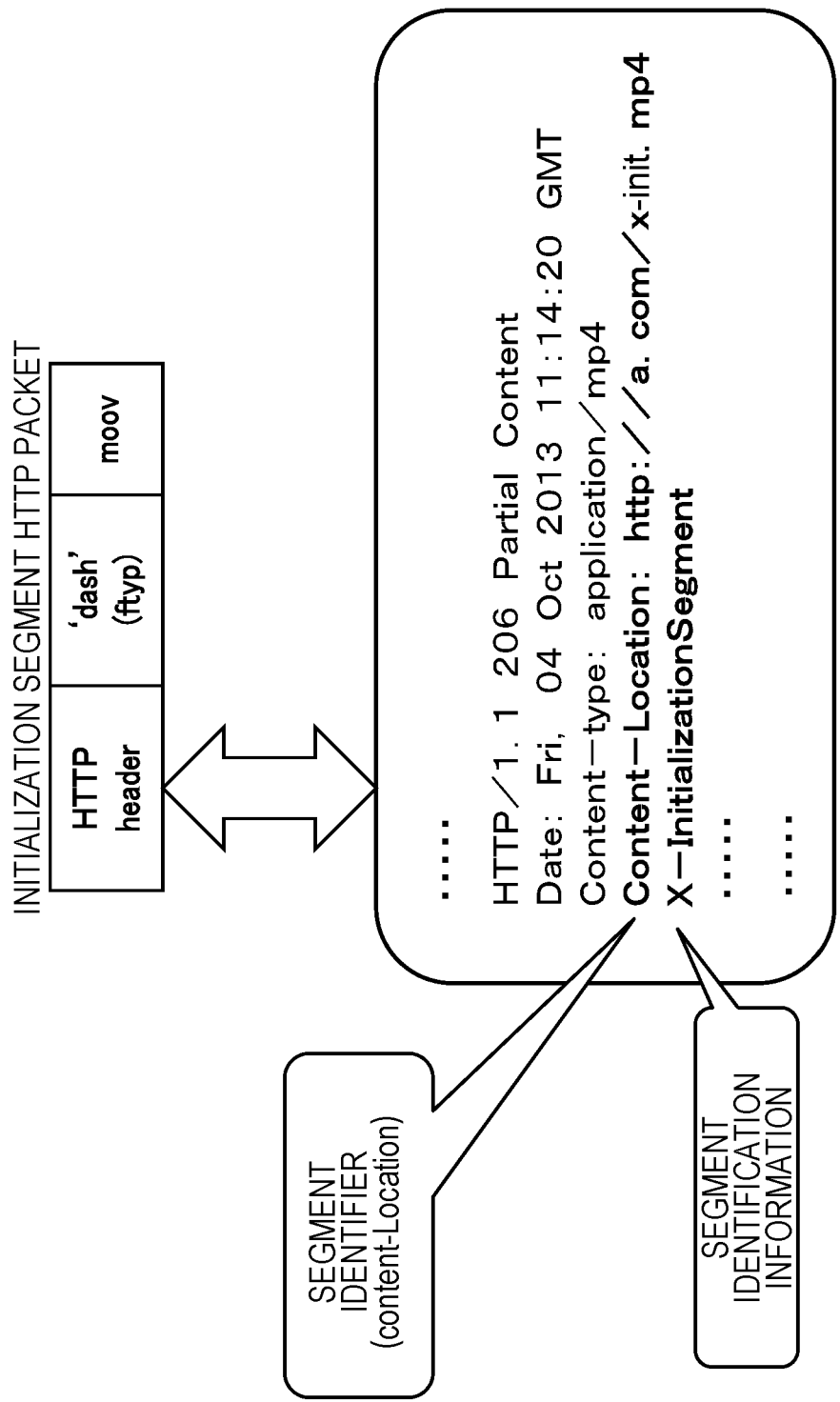
FIG. 9 is a diagram for explaining the information recorded in the HTTP header of an initialization segment HTTP packet.

Referring now to FIG. 9, the information recorded in the HTTP header of the HTTP packet storing the initialization segment is described.

Segment identification information indicating that the HTTP packet is the packet storing the initialization segment is recorded in the HTTP header of the HTTP packet storing the initialization segment.

FIG. 9 shows an example data structure of the HTTP header of the HTTP packet storing the initialization segment.

As shown in FIG. 9, the HTTP header information shown below as an example is recorded in the HTTP header.

---

"...
HTTP/1.1 206 Partial Content
Date: Fri, 04 Oct 2013 11:14:20 GMT
Content-type: application/mp4
Content-Location:http://a.com/x-init.mp4"
X-InitializationSegment
..."

---

In the above HTTP header information, the segment identifier is "Content-Location: http://a.com/x-init.mp4".

In this segment identifier, access information such as the URL of the initialization segment should be recorded.

In the above HTTP header information, the segment identification information is "X-InitializationSegment".

This segment identification information is the information indicating that the segment stored in the HTTP packet is the initialization segment.

This segment identification information is recorded in the HTTP header storing the initialization segment.

5. Structures of Packets

Next, example structures of packets to be transmitted from the transmission device to the reception device are described.

FIG. 10 shows example structures of the following two IP packets:

(1) IP packet storing an initialization segment, and
(2) IP packet storing a media segment.

The (1) IP packet storing the initialization segment has the structure shown below:

an IP header,
a UDP header,
an LCT header,
an HTTP header,
initialization segment constituent data [dash], and
initialization segment constituent data [moov].

The IP header, the UDP header, the LCT header, and the HTTP header are header information that is set in accordance with the following communication protocols: the IP protocol, the UDP protocol, the FLUTE protocol, and the HTTP protocol, respectively.

Meanwhile, the (2) IP packet storing a media segment has the structure shown below:

an IP header,
a UDP header, an LCT header,
an HTTP header,
media segment constituent data [msdh]
media segment constituent data [sidx]
media segment constituent data [moof], and
media segment constituent data [mdat].

The IP header, the UDP header, the LCT header, and the HTTP header are header information that is set in accordance with the following communication protocols: the IP protocol, the UDP protocol, the FLUTE protocol, and the HTTP protocol, respectively.

As described above, the media segment constituent data [sidx] is set in packets containing media data (mdat) that can be used in random access, but does not need to be set in the other packets.

The transmission device 20 generates the IP packets shown in FIG. 10, and then transmits the IP packets to the reception device 30.

The reception device 30 receives the respective packets shown in FIG. 10 from the reception device 20, analyzes the respective pieces of header information, extracts the segments, and performs initialization and content reproduction in accordance with the data stored in the segments.

6. Structures of and Processes to be Performed by the Transmission Device and the Reception Device Referring now to FIG. 11 and drawings shown thereafter, the structures of and the processes to be performed by the transmission device and the reception device are described.

Figure 11:
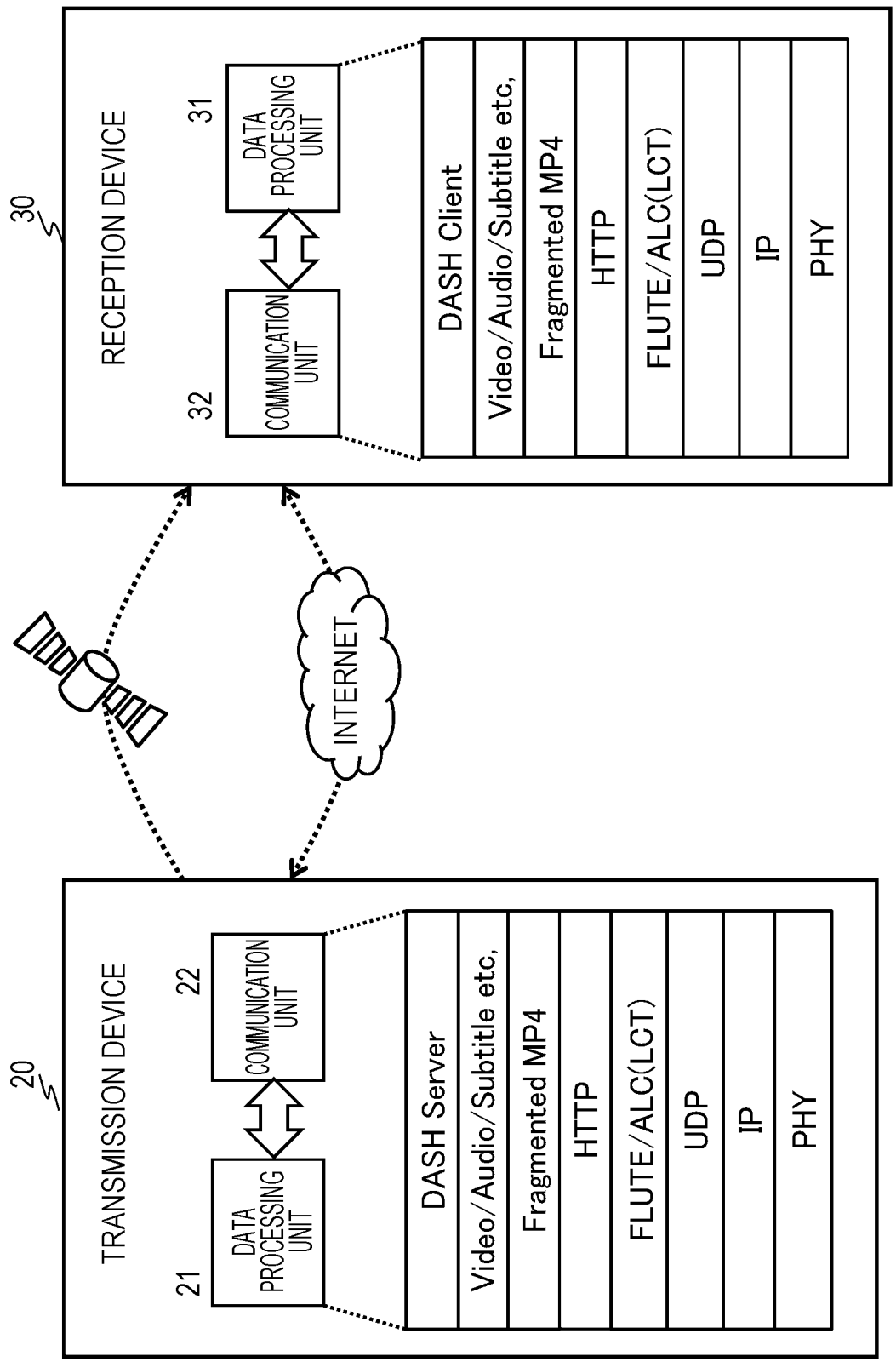
FIG. 11 is a diagram for explaining the protocol stacks of the transmission device and the reception device.

Referring first to FIG. 11, the structures and the protocol stacks of the transmission device 20 and the reception device 30 are described.

The transmission device 20 that generates and transmits the IP packets described above with reference to FIG. 10 includes a data processing unit 21 and a communication unit 22 as shown in FIG. 11.

The data processing unit 21 performs a transmission packet generation process.

Specifically, a sub GOP media segment storing media data (mdat) containing part of the constituent data of a Group of Pictures (GOP) that is a processing unit of encoded data as described above, and the metadata (moof) corresponding to the media data, for example, is generated as packet-stored data. Packet additional information such as an in-GOP location identifier indicating the in-GOP location of the media data stored in the sub GOP media segment is generated and is recorded in the HTTP header. In this manner, the packet is generated.

The communication unit 22 transmits the packet generated by the data processing unit 21.

The communication unit 22 performs broadcast distribution or multicast distribution of the packet generated by the data processing unit 21, via broadcast waves or a network such as the Internet.

The data processing unit 21 and the communication unit 22 perform a packet generation process and transmits generated packets in accordance with a protocol stack formed with the layers mentioned below. The layer structure of the protocol stack of the transmission device 20 is described below. The protocol stack of the transmission device 20 has the following layer structure, ranging from the uppermost layer to the lowermost layer:

(1) DASH Server: the application layer that performs a process such as segment generation in accordance with the DASH standards, (2) Video/Audio/Subtitle etc: the application layer that generates and acquires content to be transmitted, (3) FragmentedMP4: the application layer that generates encoded data and generates segments in accordance with the MP4 file format, (4) HTTP: the layer that generates HTTP packets each having an HTTP header in accordance with the HTTP protocol, (5) FLUTE/ALC(LCT): the layer that generates FLUTE packets each having an LCT header in accordance with the FLUTE protocol, (6) UDP: the layer that generates UDP packets each having a UDP header in accordance with the UDP protocol, (7) IP: the layer that generates IP packets each having a IP header in accordance with the IP protocol, and (8) PHY: the physical layer formed with the communication unit or the like that generates IP packets or MAC frames storing IP packets.

The reception device 30 that receives the IP packets described above with reference to FIG. 10 includes a data processing unit 31 and a communication unit 32 as shown in FIG. 11.

The communication unit 32 receives packets transmitted from the transmission device 20, and the data processing unit 31 inputs the packets received by the communication unit 31, and performs data processing.

The data processing unit 31 and the communication unit 32 receive and analyze packets in accordance with a protocol stack formed with the layers mentioned below. The protocol stack of the reception device 30 has the following layer structure, ranging from the uppermost layer to the lowermost layer:

(1) DASH Client: the application layer that performs a process such as analysis of segments in accordance with the DASH standards, (2) Video/Audio/Subtitle etc: the application layer that acquires received content and performs a reproduction process and the like, (3) FragmentedMP4: the application layer that performs a decoding process and the like on encoded data in accordance with the MP4 file format, (4) HTTP: the layer that analyzes HTTP packets each having an HTTP header in accordance with the HTTP protocol, (5) FLUTE/ALC(LCT): the layer that analyzes FLUTE packets each having an LCT header in accordance with the FLUTE protocol, (6) UDP: the layer that analyzes UDP packets each having a UDP header in accordance with the UDP protocol, (7) IP: the layer that analyzes IP packets each having a IP header in accordance with the IP protocol, and (8) PHY: the physical layer formed with the communication unit or the like that receives IP packets or MAC frames storing IP packets.

When performing broadcast transmission or multicast transmission of an IP packet as described above, the transmission device 20 performs transmission via a network or transmission via broadcast waves, or performs parallel transmission using both of these transmission paths.

The reception device 30 performs a packet reception process via a communication path of broadcast waves or a network such as the Internet, or via both communication paths.

The generation and the analysis of a transmission/reception packet via a network such as the Internet can be performed by a TCP layer, instead of the FLUTE/ALC (LCT) layer and the UDP layer shown in FIG. 11.

Figure 12:
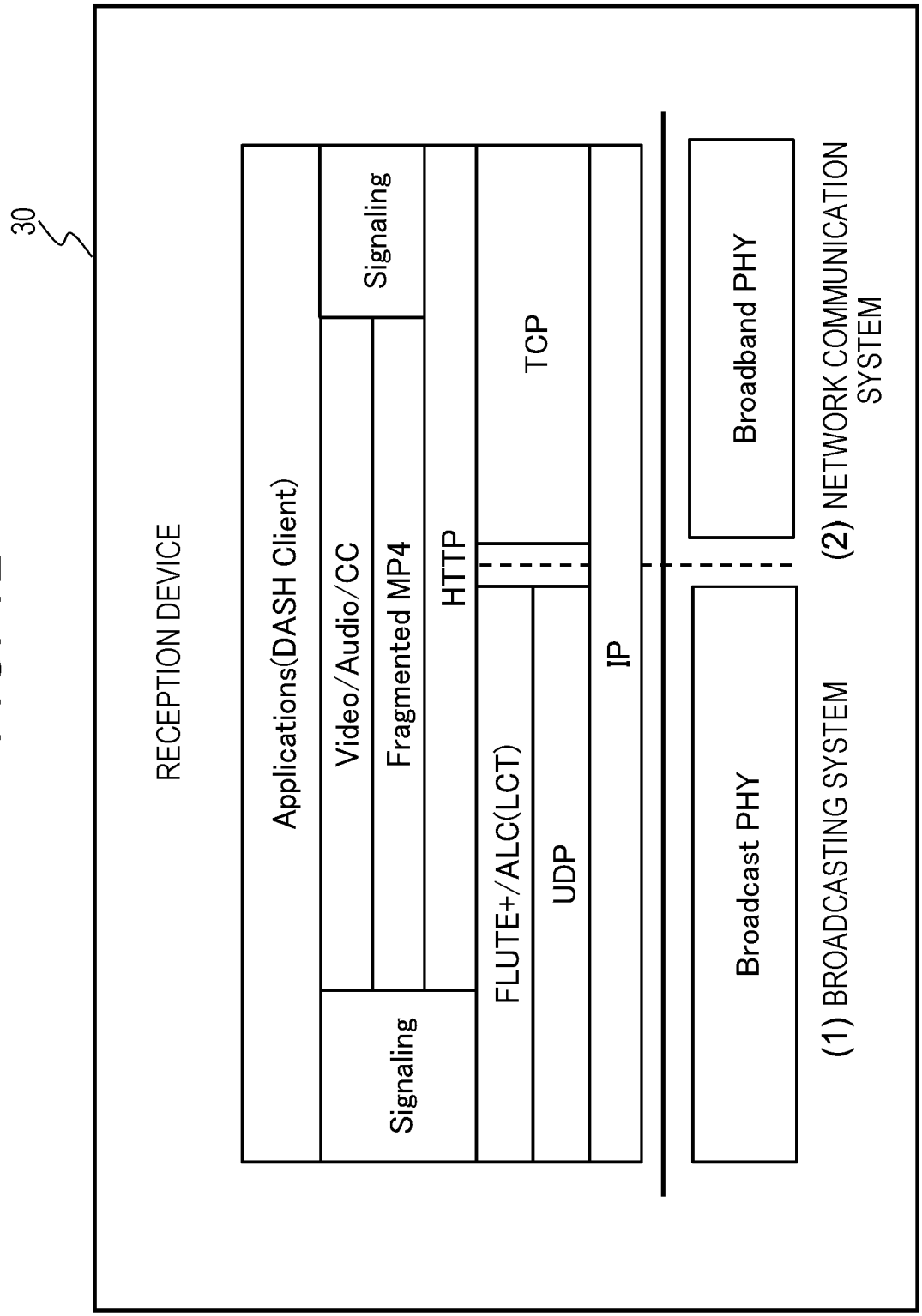
FIG. 12 is a diagram for explaining the protocol stack of the reception device.

Referring now to FIG. 12, an example of the protocol stack of the reception device 30 that performs processing by appropriately switching between IP packets received via broadcast waves and IP packets received via a network such as the Internet is described.

The protocol stack of the reception device 30 shown in FIG. 12 has the layer structure of a protocol stack compatible with the following two communication systems:

(1) broadcast system, and
(2) network communication system.

The (1) broadcast system has the layer structure described above with reference to FIG. 11.

The (2) network communication system has a structure in which the FLUTE/ALC(LCT) layer and the UDP layer of the broadcast system layers are replaced with a TCP layer.

The TCP layer analyzes TCP packets each having a TCP header.

A signaling (Signaling) layer is the layer for controlling the switching between the communication systems.

Using layers while appropriately switching between the broadcast system and the network communication system, the reception device 30 selectively uses a packet received via broadcast waves and a packet received via a network such as the Internet, and acquires content stored in a packet, to perform a reproduction process.

In a case where delay is caused in packet reception from a network, for example, the communication path is switched to the broadcast system, and the packet corresponding to the same content is received via broadcast waves, so that content reproduction can be continued.

The segment identifier and the in-GOP location identifier described above are also recorded in each packet distributed via either communication path of the network communication system and the broadcast system, and GOP data can be reconstructed by referring to the identification information. Accordingly, an error-free decoding process and error-free content reproduction are realized.

7. Process Sequences of the Transmission Device and the Reception Device

Figure 13:
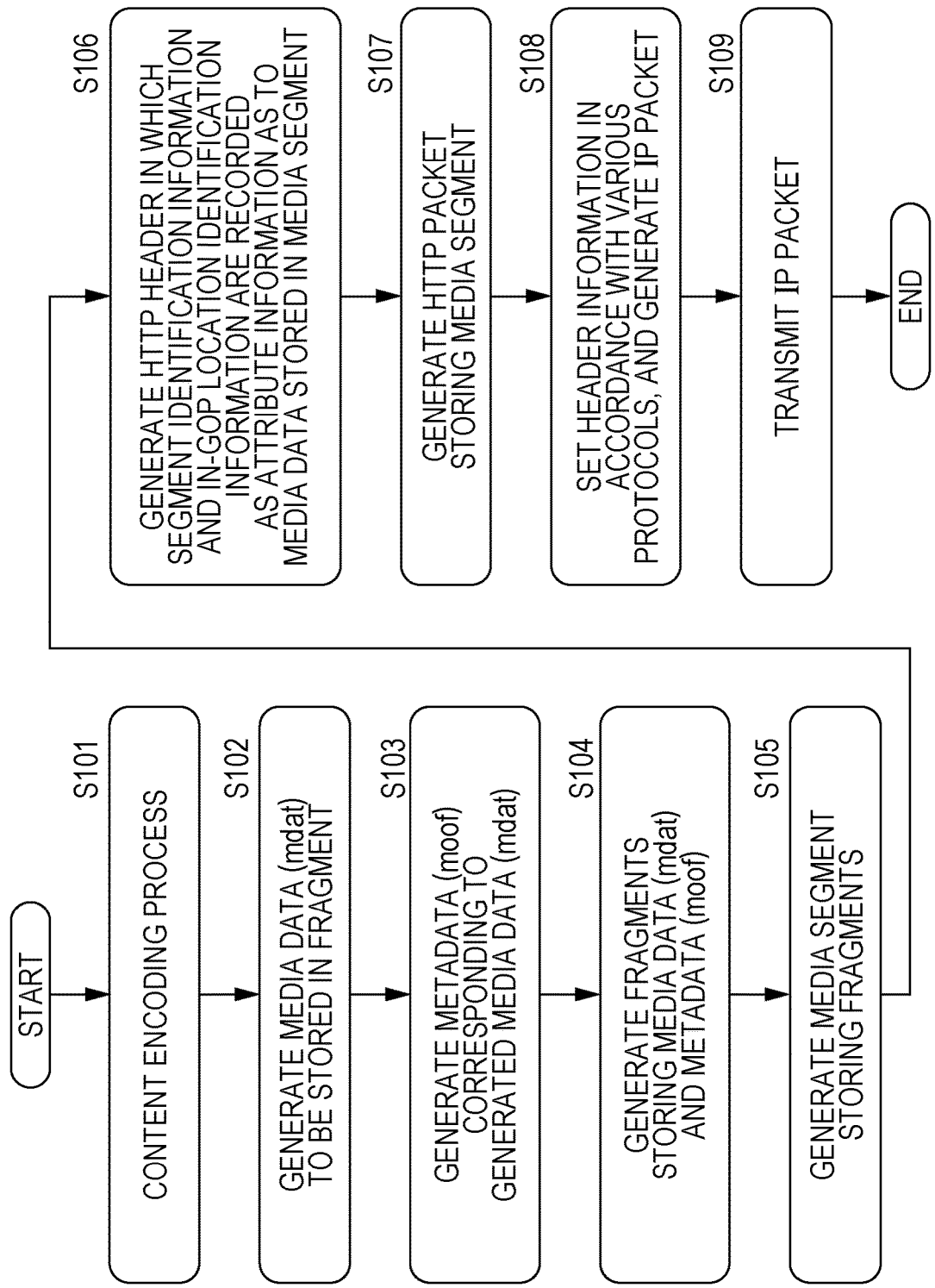
FIG. 13 is a diagram for explaining a process sequence to be executed by the transmission device.
Figure 14:
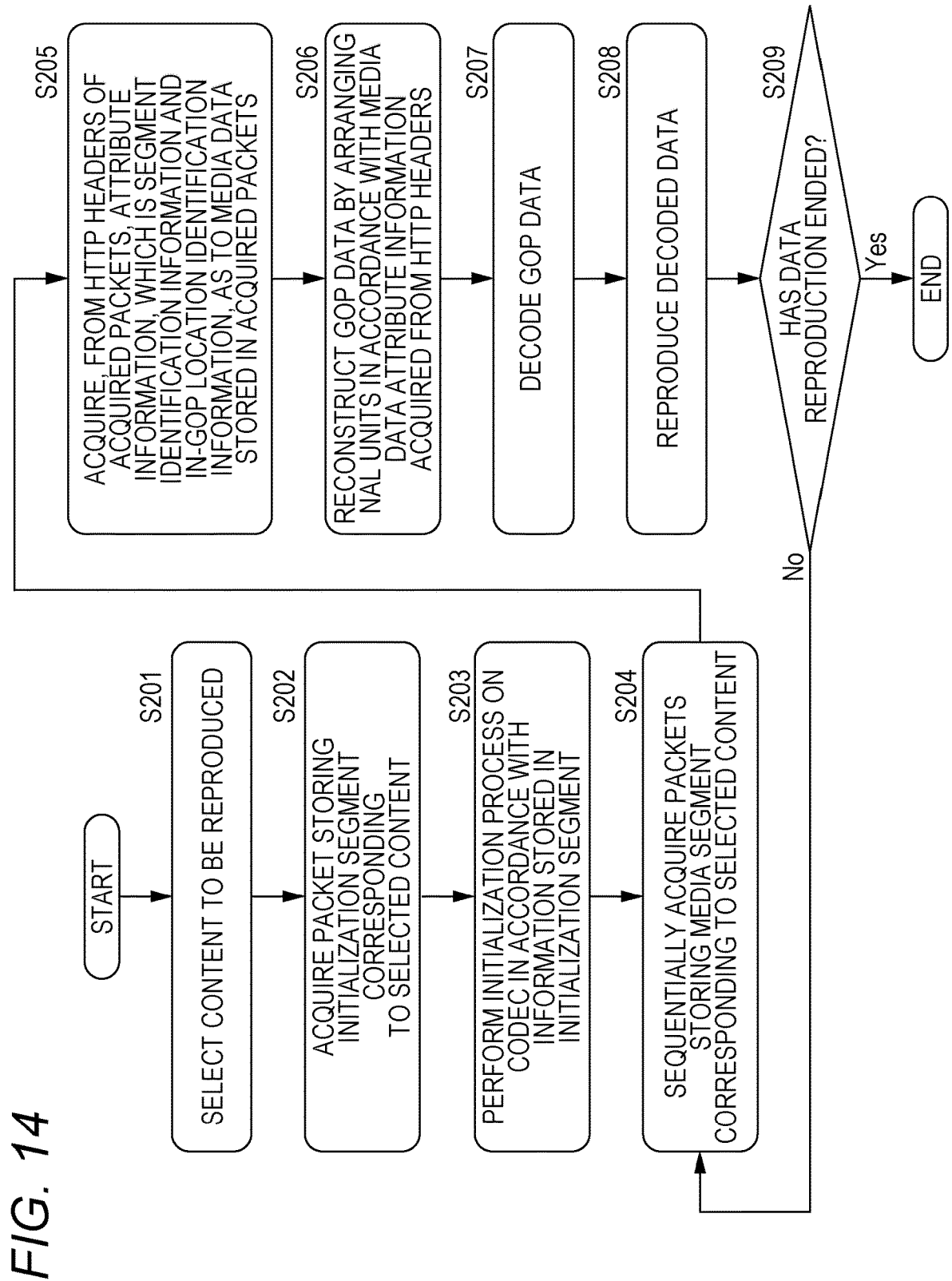
FIG. 14 is a diagram for explaining a process sequence to be executed by the reception device.

Referring now to the flowcharts shown in FIGS. 13 and 14, the process sequences to be executed by the transmission device and the reception device are described.

Referring first to the flowchart shown in FIG. 13, the process sequence to be executed by the transmission device 20 is described.

The flow shown in FIG. 13 is a flow for explaining the sequence in a process of generating and transmitting an IP packet storing a media segment.

This process is performed by the data processing unit of the transmission device 20. The data processing unit includes a CPU that has a program execution function, and performs the process in accordance with the flow shown in FIG. 13, by executing a program stored in a storage unit, for example.

The processes in the respective steps are sequentially described below.

(Step S101)

First, the data processing unit of the transmission device performs a process of encoding the content to be transmitted. For example, an encoding process in accordance with the MP4 file format is performed.

(Step S102)

The transmission device next generates the media data (mdat) to be stored in a fragment in a media segment. This process is a process of generating the media data (mdat) to be stored in a sub GOP media segment described above with reference to FIG. 5 and others. Here, media data (mdat) containing constituent data that is part of GOP data as MP4 encoded data, or one or more NAL units forming a GOP, is generated.

(Step S103)

The transmission device next generates metadata (moof) that is the attribute information corresponding to the media data (mdat) generated in step S102.

(Step S104)

The transmission device next generates fragments storing the media data (mdat) generated in step S102 and the metadata (moof) generated in step S103.

(Step S105)

The transmission device next generates a media segment storing the fragments generated in step S104.

This is a sub GOP media segment described above with reference to FIG. 5 and others. That is, this is a media segment that stores not the entire GOP data but the NAL units of part of the GOP constituent data as the media data (mdat).

(Steps S106 and S107)

The transmission device next generates segment identification information and in-GOP location identification information, which are the attribute information of the media data stored in the media segment, and generates an HTTP packet in which an HTTP header storing the above identification information is set.

The above identification information is the identification information described above with reference to FIGS. 7 and 8.

(Steps S108 and S109) The transmission device next sets an LCT header, a UDP header, and an IP header in the HTTP packet, and generates and transmits an IP packet. The transmission process is performed via a communication network such as the Internet or broadcast waves, or via both of the communication paths.

The flow shown in FIG. 13 is a flow for explaining the sequence in the process of generating and transmitting an IP packet storing a media segment. When a packet storing an initialization segment is generated, a process of recording segment identification information indicating that the segment is the initialization segment in the HTTP header is further performed after the generation of the constituent data of the initialization segment. The other aspects of the process are substantially the same as the procedures in the flow shown in FIG. 13.

Referring now to the flowchart shown in FIG. 14, the process sequence from packet reception to content reproduction to be performed in the reception device is described.

This process is performed by the data processing unit of the reception device 30. The data processing unit includes a CPU that has a program execution function, and performs the process in accordance with the flow shown in FIG. 14, by executing a program stored in a storage unit, for example.

The processes in the respective steps are sequentially described below.

(Step S201)

First, in step S201, the reception device inputs information about reproduction content designated by a user. For example, a content list such as a program listing received beforehand from the transmission device is displayed on a display unit, and the content to be reproduced is determined based on information input by the user in response to the displayed information.

(Step S202)

The reception device then receives a packet containing the initialization segment corresponding to the content selected as the content to be reproduced, and acquires the initialization segment.

Segment identification information is recorded in the HTTP header of the HTTP packet storing the initialization segment as described above with reference to FIG. 9, and the packet can be confirmed to be the HTTP packet storing the initialization segment by referring to the identification information.

(Step S203)

The reception device performs reception device initialization in accordance with the data stored in the received initialization segment. Specifically, the codec setting parameters and the like stored in the initialization segment are acquired, and codec setting and the like are performed in accordance with the acquired parameters.

(Step S204)

The reception device then sequentially receives packets storing the media segments corresponding to the content selected in step S201. As described above with reference to FIG. 5 and others, each of the packets is a packet that stores, as the payload, a sub GOP media segment storing the data of a smaller unit than the data of one GOP. The reception device sequentially receives packets storing such sub GOP media segments.

(Step S205)

The reception device next acquires identification information such as segment identifiers and in-GOP location identification information from the HTTP headers of sub GOP media segment HTTP packets.

As described above with reference to FIGS. 7 and 8, a segment identifier is data that includes the content location information about the segment stored in the HTTP packet, the type of the segment, and the identification information about the GOP to which the media data (mdat) stored in the packet belongs.

In-GOP location identification information is data that indicates in which position in one GOP the media data (mdat) stored in the HTTP packet is located. For example, a packet having X-StartofGOP as the in-GOP location identification information is the packet that stores the NAL units in the first area of the GOP data as the media data (mdat).

(Step S206)

The reception device next rearranges the NAL units stored in the sub GOP media segment HTTP packets in accordance with the identification information acquired from the HTTP headers, to reconstruct the data of one GOP.

(Steps S207 and S208)

The reception device next performs a decoding process on the reconstructed GOP data, and performs a process of reproducing the decoded data.

(Step S209)

The reception device next determines whether the data reproduction process has ended, and if not, returns to step S204 and repeats the processes in steps S204 and thereafter.

If it is determined in step S209 that the reproduction process has ended, the process comes to an end.

In a case where only an image at a certain reproduction location is reproduced in random access reproduction, for example, the process may be performed only on the segment having the sidx data as random access point information set in a sub GOP media segment.

In this case, only the data at a random access point can be selected and reproduced, without rearrangement of the entire GOP data.

8. Embodiment in which Additional Information is Recorded in an Extension Header In the embodiment described above, additional information for smooth processing on the reception device side, such as information to be used in the GOP reconstruction process, is recorded in an HTTP packet.

However, additional information is not necessarily recorded in an HTTP header, and may be recorded in various other headers.

In the description below, an embodiment in which additional information is recorded in an extension header is described.

Referring now to FIG. 15, the embodiment in which additional information is recorded in an extension header is described.

The examples shown in FIG. 15 are examples where a new extension header is inserted between an HTTP header and a sub GOP media segment, and additional information is recorded in the extension header.

FIG. 15 shows the following two types of HTTP packets:
(1) initialization segment HTTP packet, and
(2) sub GOP media segment HTTP packet.

In the HTTP header of each of the packets, the extension header described below is set.

In this extension header, (a) segment identification information and (b) in-GOP location identification information are stored.

For example, the (a) segment identification information is 8-bit data. In the case of the initialization segment, "1" is set. In the case of any other segment, "0" is set.

In the case of a media segment, the content location information (ContentLocation) recorded in the HTTP header is set as the location information about the data of the GOP. In this manner, the data of each GOP can be identified by referring to this content location information.

The (b) in-GOP location identification information is 8-bit data, and the example bit values shown below are set:
the data in the start position in the GOP (StartofGOP)=1;
the data in the middle position in the GOP (MiddleofGOP)=2; and
the data in the end position in the GOP (EndofGOP)=3.

The transmission device sets such an extension header, and transmits the extension header to the reception device. In turn, the reception device refers to the segment identification information in this extension header, and determines whether the segment stored in the packet is an initialization segment, or whether the segment stored in the packet is a sub GOP media segment. If the packet is identified as a sub GOP media segment packet, the reception device further refers to the in-GOP location identification information in the extension header, to determine in which position in the GOP the data corresponding to the media data (mdat) stored in the sub GOP media segment is located.

9. Embodiment in which Additional Information is Recorded in an LCT Header

As described above, examples of transport protocols that can be applied to multicast or broadcast (MC/BC) streaming include Real-time Transport Protocol (RTP) and File Delivery over Uni-directional Transport (FLUTE).

In a packet that is set in accordance with the FLUTE protocol, an LCT header serving as header information in accordance with the FLUTE protocol is set.

That is, such an LCT header is the LCT header in an IP packet described above with reference to FIG. 10.

In the description below, an embodiment in which additional information for smooth processing on the reception device side, such as information to be used in the GOP reconstruction process, is recorded in this LCT header is described.

Figure 16:
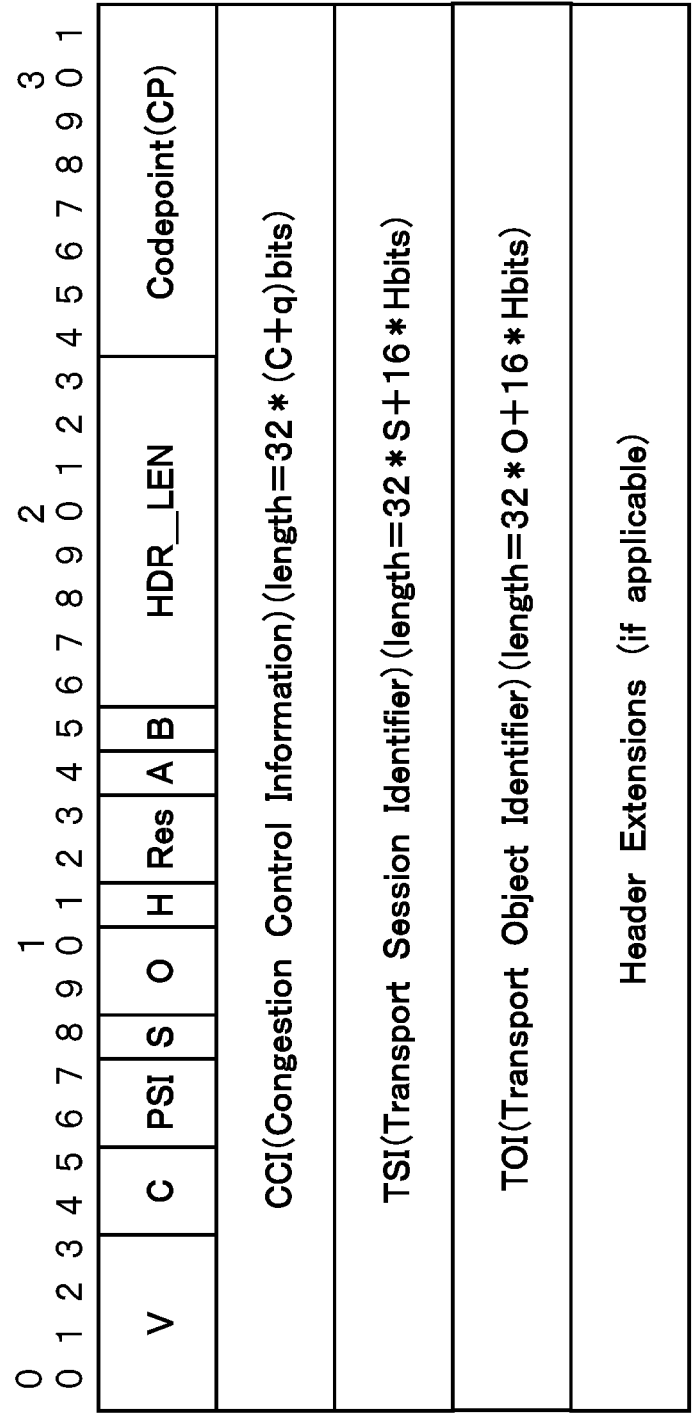
FIG. 16 is a diagram for explaining an example structure of an LCT header that is set in accordance with the FLUTE protocol.

FIG. 16 shows an example structure of an LCT header that is set in accordance with the FLUTE protocol.

For example, the principal data fields set in the LCT header include the following fields:

Congestion Control Information (CCI): the field to record the lengths of the respective fields, congestion control information, and the like, Transport Session Identifier (TSI): the field to record session information about a packet transfer, Transport Object Identifier (TOI): the field to record a packet transfer sequence and the like, and header extension portion (Header Extensions): a field to record various kinds of extension data.

As described above with reference to FIG. 7, the data transmission order can be checked by referring to the above TOI, instead of in-GOP location information.

As described above, as for the in-GOP location information as the additional information to be recorded in the HTTP header or the like, only X-StartofGOP indicating the start position may be recorded, and a packet sequence is acquired as the order of data in the GOP by referring to the TOI in the LCT header, so that the NAL units in the GOP can be arranged in the correct order in accordance with the packet sequence.

As shown in FIG. 16, a header extension portion (Header Extensions) in which various kinds of data can be recorded is set in the LCT header. In this header extension portion, additional information for smooth processing on the reception device side, such as information to be used in the GOP reconstruction process, can be recorded.

Referring now to FIG. 17, the structure of data recorded in the header extension portion of an LCT header is described.

There are two types of formats for recording data in the header extension portion of an LCT header.

FIG. 17(1) shows a format in which the length of recorded information can be arbitrarily set.

FIG. 17(2) shows a format in which the length of recorded information is fixed.

In Header Extension Type (HET), extension header identification information (a numerical value) indicating the type of the extension header is recorded. A value of 127 or smaller can be used in the format shown in FIG. 17(1), and a value of 128 or larger can be set in the format shown in FIG. 17(2).

In Header Extension Length (HET), the length of the extension header is recorded.

Neader Extension Content (HEC) is the field to record extension header content, and is also the field in which any extension information can be recorded.

FIG. 18 shows an example structure of data recorded in a case where the format shown in FIG. 17(2) having the length of recorded information fixed is used, and additional information for smooth processing on the reception device side, such as information to be used in the GOP reconstruction process, is recorded.

As shown in FIG. 18, the (a) extension header identification information (HET) is 8-bit data, and [200], for example, is recorded as a new information identification value.

Moreover, in the extension information recording portion (HEC), identification information such as (b) segment identification information and (c) in-GOP location identification information is recorded.

For example, the (b) segment identification information is 8-bit data. In the case of the initialization segment, "1" is set. In the case of any other segment, "0" is set.

In the case of a media segment, the content location information (ContentLocation) recorded in the HTTP header is set as the location information about the data of the GOP. In this manner, the data of each GOP can be identified by referring to this content location information.

The (c) in-GOP location identification information is 8-bit data, and the example bit values shown below are set:

the data in the start position in the GOP (StartofGOP)=1;

the data in the middle position in the GOP (MiddleofGOP)=2; and the data in the end position in the GOP (EndofGOP)=3.

The transmission device sets an LCT header containing such extension header information, and transmits the LCT header to the reception device. In turn, the reception device refers to the segment identification information in the extension header information in this LCT header, and determines whether the segment stored in the packet is an initialization segment, or whether the segment stored in the packet is a sub GOP media segment. If the packet is identified as a sub GOP media segment packet, the reception device further refers to the in-GOP location identification information recorded in the extension header information in the LCT header, to determine in which position in the GOP the data corresponding to the media data (mdat) stored in the sub GOP media segment is located.

10. Example Applications to HEVC Encoded Data

Although example processes to be performed on MP4 encoded data in accordance with the MPEG encoding technique have been described in the above embodiments, processes according to the present disclosure can also be applied to other encoded data. For example, it is possible to apply the present disclosure to encoded data according to High Efficiency Video Coding (HEVC).

Referring now to FIG. 19, the structure of HEVC encoded data is described.

As shown in FIG. 19, an HEVC stream generated through an HEVC encoding process includes sequences (CVS: Coded Video Sequences) and an end-of-sequence NAL unit (EoB).

Each CVS as a constituent element of the HEVC stream is formed with GOPs and an end-of-sequence NAL unit (EoS).

Each one GOP includes an Intra Random Access Point (IRAP) access unit that is the random access point as the first data, Leading Picture (LP) access units, and a Trailing Picture (TP) access unit.

The LP access units and the TP access unit are access units that can be decoded by referring to a reference picture of some kind.

In a case where decoding is started from the IRAP access unit, however, normal decoding and reproduction can also be performed on the TPAU.

Each access unit (AU) is formed with Network Abstraction Layer Units (NAL units), and invariably includes one or more slice segment NAL units.

As shown in FIG. 19, GOPs as the encoding processing units are also set in encoded data generated through an HEVC encoding process, and each of the GOPs is further divided into NAL units.

This is a structure in which one or more NAL units as constituent data of GOPs set in HEVC encoded data are stored in a sub GOP media segment described above with reference to FIG. 5.

In this manner, fragments storing media data (mdat) of NAL units generated by dividing GOP data can also be generated for HEVC encoded data. Accordingly, the sub GOP media segments described above with reference to FIG. 5 and others can be generated, and processes according to the present disclosure can be performed.

It should be noted that processes according to the present disclosure can be applied not only to MP4 and HEVC but also to any encoding structure that has encoding processing units equivalent to GOPs and includes units (NAL) generated by dividing GOP data.

11. Example Hardware Configurations of Respective Devices

Lastly, example hardware configurations of the respective devices that perform the above described processes are described, with reference to FIG. 20.

FIG. 20 shows an example hardware configuration of a communication device that can be used as the transmission device 20 or the reception device 30.

A Central Processing Unit (CPU) 201 functions as a data processing unit that performs various kinds of processes in accordance with a program stored in a Read Only Memory (ROM) 202 or a storage unit 208. For example, processes in accordance with the sequences described in the above embodiments are performed. The program to be executed by the CPU 201 and data are stored in a Random Access Memory (RAM) 203. The CPU 201, the ROM 202, and the RAM 203 are connected to one another by a bus 204.

The CPU 201 is connected to an input/output interface 205 via the bus 204, and an input unit 206 formed with various kinds of switches, a keyboard, a mouse, a microphone, and the like, and an output unit 207 formed with a display, a speaker, and the like are also connected to the input/output interface 205. The CPU 201 performs various kinds of processes in accordance with instructions that are input through the input unit 206, and outputs processing results to the output unit 207, for example.

The storage unit 208 connected to the input/output interface 205 is formed with a hard disk, for example, and stores the program to be executed by the CPU 201 and various kinds of data. A communication unit 209 functions as a transmission/reception unit for data communication via a network such as the Internet or a local area network, further functions as a broadcast wave transmission/reception unit, and communicates with an external device.

A drive 210 connected to the input/output interface 205 drives a removable medium 211 that is a magnetic disk, an optical disk, a magnetooptical disk, a semiconductor memory such as a memory card, or the like, to record or read data.

It should be noted that data encoding or decoding can be performed as a process by the CPU 201 serving as the data processing unit, but a codec may be provided as special-purpose hardware for performing an encoding process or a decoding process.

12. Summary of the Structures of the Present Disclosure

Embodiments of the present disclosure have been described so far by way of specific embodiments. However, it is obvious that those skilled in the art can make modifications to and substitutions of the embodiments without departing from the scope of the present disclosure. That is, the present invention is disclosed in the form of examples, and the above description should not be interpreted in a restrictive manner. The claims should be taken into account in understanding the subject matter of the present disclosure.

The technology disclosed in this specification may also be embodied in the structures described below.

(1) A communication device including:

a data processing unit that generates a sub GOP media segment as packet-stored data, the sub GOP media segment storing media data including only part of constituent data of a Group of Pictures (GOP) as a processing unit of encoded data, and metadata corresponding to the media data, and generates a packet having an in-GOP location identifier recorded as packet additional information therein, the in-GOP location identifier indicating an in-GOP location of the media data stored in the sub GOP media segment; and a communication unit that transmits the packet generated by the data processing unit.

(2) The communication device of (1), wherein the data processing unit generates a sub GOP media segment as packet-stored data, the sub GOP media segment storing media data including one or more NAL units and metadata corresponding to the media data, the one or more NAL units being constituent data of the GOP.

(3) The communication device of (1) or (2), wherein the data processing unit generates a packet having segment identification information recorded as packet additional information therein, the segment identification information enabling determination as to whether the packet-stored segment is an initialization segment not storing the media data or whether the packet-stored segment is a media segment storing the media data.

(4) The communication device of any one of (1) through (3), wherein the data processing unit generates an in-GOP location identifier as packet additional information, the in-GOP location identifier enabling determination as to in which one of a start position, a middle position, and an end position in the GOP the media data stored in the sub GOP media segment is located.

(5) The communication device of any one of (1) through (4), wherein the data processing unit records the additional information in an HTTP header in the generated packet.

(6) The communication device of any one of (1) through (4), wherein the data processing unit records the additional information in an extension header in the generated packet.

(7) The communication device of any one of (1) through (4), wherein the data processing unit records the additional information in an LCT header in the generated packet.

(8) The communication device of any one of (1) through (7), wherein the communication unit transmits the packet generated by the data processing unit through broadcast distribution via broadcast waves, or through multicast distribution.

(9) A communication device including: a communication unit that handles a sub GOP media segment as packet-stored data, the sub GOP media segment storing media data including only part of constituent data of a Group of Pictures (GOP) as a processing unit of encoded data, and metadata corresponding to the media data, and receives a packet having an in-GOP location identifier recorded as packet additional information therein, the in-GOP location identifier indicating an in-GOP location of the media data stored in the sub GOP media segment; and a data processing unit that inputs the packet received by the communication unit, and performs processing.

(10) The communication device of (9), wherein the data processing unit arranges the GOP constituent data dispersed and stored in a plurality of received packets and reconstructs GOP data, by referring to the in-GOP location identifiers recorded in the received packets.

(11) The communication device of (9) or (10), wherein the communication unit receives a packet storing a sub GOP media segment, the sub GOP media segment storing media data including one or more NAL units and metadata corresponding to the media data, the one or more NAL units being constituent data of the GOP, and the data processing unit acquires the media data including the one or more NAL units from the received packet, and arranges NAL units dispersed and stored in a plurality of received packets and reconstructs GOP data, by referring to the in-GOP location identifiers recorded in the received packets.

(12) The communication device of any one of (9) through (11), wherein the communication unit receives a packet having segment identification information recorded as packet additional information therein, the segment identification information enabling determination as to whether the packet-stored segment is an initialization segment not storing the media data or whether the packet-stored segment is a media segment containing the media data, and the data processing unit acquires the segment identification information from the additional information recorded in the received packet, determines a type of the segment stored in the received packet, and performs processing in accordance with a result of the determination.

(13) The communication device of any one of (9) through (12), wherein the communication unit receives a packet having an in-GOP location identifier set as packet additional information, the in-GOP location identifier enabling determination as to in which one of a start position, a middle position, and an end position in the GOP the media data stored in the sub GOP media segment is located, and the data processing unit determines in which one of the start position, the middle position, and the end position in the GOP the media data stored in the sub GOP media segment is located based on the in-GOP location identifier recorded in the received packet.

(14) The communication device of any one of (9) through (13), wherein the communication unit receives a packet having the packet additional information recorded in an HTTP header, and the data processing unit acquires the packet additional information from the HTTP header of the received packet.

(15) The communication device of any one of (9) through (13), wherein the communication unit receives a packet having the packet additional information recorded in an extension header, and the data processing unit acquires the packet additional information from the extension header of the received packet.

(16) The communication device of any one of (9) through (13), wherein the communication unit receives a packet having the packet additional information recorded in an LCT header, and the data processing unit acquires the packet additional information from the LCT header of the received packet.

(17) The communication device of any one of (9) through (16), wherein the communication unit receives the packet via broadcast waves.

(18) A communication data generation method implemented in a data transmission device, the communication data generation method including:

generating a sub GOP media segment as packet-stored data, the sub GOP media segment storing media data including only part of constituent data of a Group of Pictures (GOP) as a processing unit of encoded data, and metadata corresponding to the media data, and generating a packet having an in-GOP location identifier recorded as packet additional information therein, the in-GOP location identifier indicating an in-GOP location of the media data stored in the sub GOP media segment, the generating the sub GOP media segment and the generating the packet being carried out by a data processing unit.

(19) A communication data processing method implemented in a data reception device, the communication data processing method including:

handling a sub GOP media segment as packet-stored data, the sub GOP media segment storing media data including only part of constituent data of a Group of Pictures (GOP) as a processing unit of encoded data, and metadata corresponding to the media data, the handling the sub GOP media segment being carried out by a communication unit;

receiving a packet having an in-GOP location identifier recorded as packet additional information therein, the in-GOP location identifier indicating an in-GOP location of the media data stored in the sub GOP media segment, the receiving the packet being carried out by the communication unit; and inputting the packet received by the communication unit, and performing processing, the inputting the packet and the performing the processing being carried out by a data processing unit.

The series of processes described in this specification can be performed by hardware, software, or a combination of hardware and software. In a case where processes are performed by software, a program in which the process sequences are recorded may be installed into a memory incorporated into special-purpose hardware in a computer, or may be installed into a general-purpose computer that can perform various kinds of processes. For example, the program can be recorded beforehand into a recording medium. The program can be installed from the recording medium into a computer, or can be received via a network such as a Local Area Network (LAN) or the Internet and be installed into a recording medium such as an internal hard disk.

The respective processes described in this specification may not be performed in chronological order according to the description, but may be performed in parallel or independently of one another depending on the configuration/capability of the device performing the processes or as necessary. In this specification, a system is a logical assembly of devices, and does not necessarily mean devices with different structures incorporated into one housing.

INDUSTRIAL APPLICABILITY

As described so far, with a structure of an embodiment of the present disclosure, devices and methods that enable content distribution of data units generated by dividing a GOP, and GOP reconstruction and reproduction on the reception device side are realized.

Specifically, a transmission device generates a sub GOP media segment as packet-stored data, the sub GOP media segment storing media data including only part of constituent data of a Group of Pictures (GOP) as a processing unit of encoded data and metadata corresponding to the media data, and generates and transmits a packet having an in-GOP location identifier recorded as packet additional information therein, the in-GOP location identifier indicating the in-GOP location of the media data stored in the sub GOP media segment. A reception device arranges media data dispersed and stored in packets by referring to the in-GOP location identifiers stored in received packets, and reconstructs and decodes a GOP.

With this structure, devices and methods that enable content distribution of data units generated by dividing a GOP, and GOP reconstruction and reproduction on the reception device side are realized.

REFERENCE SIGNS LIST

10 Communication system
20 Transmission device
21 Data processing unit
22 Communication unit
30 Reception device
31 Data processing unit
32 Communication unit
50 Initialization segment
60 Media segment
201 CPU
202 ROM
203 RAM
204 Bus
205 Input/output interface
206 Input unit
207 Output unit
208 Storage unit
209 Communication unit
210 Drive
211 Removable medium

The invention claimed is:

1. A communication device comprising:
a memory that stores instructions;
processing circuitry configured to execute the instructions to
divide media data of a Group of Pictures (GOP) into portions of the media data, the GOP being a processing unit in video encoding to be decoded after all the portions of the media data are gathered, and
generate packets storing the media data of the GOP, each of the packets storing a respective one of the portions of the media data, a header of each of the packets including a segment identifier and an in-GOP location identifier, the segment identifier identifying the GOP, and the in-GOP location identifier indicating whether the respective portion of the media data stored therein corresponds to a first portion, a middle portion, or a last portion of the GOP; and
a transmitter configured to transmit the generated packets.

2. The communication device according to claim 1, wherein the processing circuitry is configured to generate the packets such that each of the packets stores the respective portion of the media data using one or more Network Abstraction Layer (NAL) units.

3. The communication device according to claim 1, wherein the processing circuitry is configured to generate an initialization packet in addition to the packets, a header of the initialization packet including segment identification information indicating that a payload of the initialization packet corresponds to an initialization segment that is not part of the media data.

4. The communication device according to claim 1, wherein the processing circuitry is configured to include the in-GOP location identifiers of the packets in respective Hypertext Transfer Protocol (HTTP) headers of the packets.

5. The communication device according to claim 1, wherein the processing circuitry is configured to include the in-GOP location identifiers of the packets in respective extension headers of the packets.

6. The communication device according to claim 1, wherein the processing circuitry is configured to include the in-GOP location identifiers of the packets in respective File Delivery over Unidirectional Transport (FLUTE) LCT headers of the packets.

7. The communication device according to claim 1, wherein the transmitter is configured to transmit the generated packets through broadcast distribution via broadcast signals, or through multicast distribution.

8. The communication device according to claim 1, wherein
the GOP includes a random access point access unit of video content,
one of the packets stores the portion of the media data that includes the random access point access unit, and
the header of the one of the packets further includes an indicator indicating that the one of the packets stores the portion of the media data that includes the random access point access unit.

9. A communication device comprising:
a receiver configured to receive packets storing media data of a Group of Pictures (GOP), the GOP being a processing unit in video encoding to be decoded after all portions of the media data are gathered, each of the packets storing a respective portion of the media data, a header of each of the packets including a segment identifier and an in-GOP location identifier, the segment identifier identifying the GOP, and the in-GOP location identifier indicating whether the respective portion of the media data stored therein corresponds to a first portion, a middle portion, or a last portion of the GOP;
a memory that stores instructions; and
processing circuitry configured to execute the instructions to
reconstruct the media data of the GOP based on the portions of the media data stored in the received packets and the in-GOP location identifiers included in the packets, and
decode the reconstructed media data for reproduction of the GOP.

10. The communication device according to claim 9, wherein each of the packets stores the respective portion of the media data using one or more Network Abstraction Layer (NAL) units, and the processing circuitry is configured to
acquire the NAL units from the received packets, and arrange the acquired NAL units by referring to the in-GOP location identifiers included in the received packets.

11. The communication device according to claim 9, wherein
the receiver is configured to receive an initialization packet in addition to the packets, a header of the initialization packet including segment identification information indicating that a payload of the initialization packet corresponds to an initialization segment that is not part of the media data, and
the processing circuitry is configured to
identify the initialization packet according to the segment identification information from the header of the initialization packet, and
obtain initialization information from the payload of the initialization packet.

12. The communication device according to claim 9, wherein
the processing circuitry is configured to obtain the in-GOP location identifiers of the received packets from respective Hypertext Transfer Protocol (HTTP) headers of the received packets.

13. The communication device according to claim 9, wherein
the processing circuitry is configured to obtain the in-GOP location identifiers of the received packets from respective extension headers of the received packets.

14. The communication device according to claim 9, wherein
the processing circuitry is configured to obtain the in-GOP location identifiers of the received packets from respective File Delivery over Unidirectional Transport (FLUTE) LCT headers of the received packets.

15. The communication device according to claim 9, wherein the receiver is configured receive the packets via broadcast signals.

16. A communication method implemented in a data transmission device, the communication method comprising:
dividing, by processing circuitry of the data transmission device, media data of a Group of Pictures (GOP) into portions of the media data, the GOP being a processing unit in video encoding to be decoded after all the portions of the media data are gathered;

generating, by the processing circuitry of the data transmission device, packets storing the media data of the GOP, each of the packets storing a respective one of the portions of the media data, a header of each of the packets including a segment identifier and an in-GOP location identifier, the segment identifier identifying the GOP, and the in-GOP location identifier indicating whether the respective portion of the media data stored therein corresponds to a first portion, a middle portion, or a last portion of the GOP; and
transmitting, by a transmitter of the data transmission device, the generated packets.

17. The communication method according to claim 16, wherein the generating the packets is performed such that each of the packets stores the respective portion of the media data using one or more Network Abstraction Layer (NAL) units.

18. A communication method implemented in a data reception device, the communication method comprising:
receiving, by a receiver of the data reception device, packets storing media data of a Group of Pictures (GOP), the GOP being a processing unit in video encoding to be decoded after all portions of the media data are gathered, each of the packets storing a respective portion of the media data, a header of each of the packets including a segment identifier and an in-GOP location identifier, the segment identifier identifying the GOP, and the in-GOP location identifier indicating whether the respective portion of the media data stored therein corresponds to a first portion, a middle portion, or a last portion of the GOP;
reconstructing, by processing circuitry of the data reception device, the media data of the GOP based on the portions of the media data stored in the received packets and the in-GOP location identifiers included in the packets; and
decoding, by the processing circuitry of the data reception device, the reconstructed media data for reproduction of the GOP.

19. The communication method according to claim 18, wherein
each of the packets stores the respective portion of the media data using one or more Network Abstraction Layer (NAL) units, and
the communication method further comprises:
acquiring the NAL units from the received packets, and arranging the acquired NAL units by referring to the in-GOP location identifiers included in the received packets.

* * * * *